(12) United States Patent
Teppig, Jr. et al.

(10) Patent No.: US 9,242,523 B2
(45) Date of Patent: Jan. 26, 2016

(54) AUTONOMOUS MARITIME CONTAINER SYSTEM

(75) Inventors: William Teppig, Jr., Mt. Airy, MD (US); James Whang, Potomac, MD (US)

(73) Assignee: Aeplog, Inc., Potomac, MD (US)

( * ) Notice: Subject to any disclaimer, the term of this patent is extended or adjusted under 35 U.S.C. 154(b) by 226 days.

(21) Appl. No.: 13/075,744

(22) Filed: Mar. 30, 2011

(65) Prior Publication Data

US 2012/0192779 A1    Aug. 2, 2012

Related U.S. Application Data

(60) Provisional application No. 61/318,811, filed on Mar. 30, 2010, provisional application No. 61/318,813, filed on Mar. 30, 2010, provisional application No. 61/348,930, filed on May 27, 2010, provisional application No. 61/348,948, filed on May 27, 2010, provisional application No. 61/348,941, filed on May 27, 2010, provisional application No. 61/348,926, filed on May 27, 2010, provisional application No. 61/348,916, filed on May 27, 2010, provisional application No. 61/348,904, filed on May 27, 2010.

(51) Int. Cl.
| | |
|---|---|
| *B63B 38/00* | (2006.01) |
| *B63B 1/34* | (2006.01) |
| *B60F 3/00* | (2006.01) |
| *B63B 7/04* | (2006.01) |
| *B63B 27/34* | (2006.01) |
| *B63B 35/32* | (2006.01) |
| *B63H 5/00* | (2006.01) |
| *B63B 35/00* | (2006.01) |
| *B63G 8/00* | (2006.01) |
| *B63H 1/34* | (2006.01) |

(52) U.S. Cl.
CPC ............ *B60F 3/0015* (2013.01); *B60F 3/0038* (2013.01); *B60F 3/0061* (2013.01); *B63B 7/04* (2013.01); *B63B 27/34* (2013.01); *B63B 35/32* (2013.01); *B63B 2035/007* (2013.01); *B63G 2008/004* (2013.01); *B63H 5/00* (2013.01); *B63H 2001/342* (2013.01)

(58) Field of Classification Search
CPC .... B62D 55/06; B62D 55/065; B62D 55/084; B62D 55/26; B60F 3/00; B60F 3/0007; B60F 3/0015; B60F 2301/04
USPC .................. 180/9, 9.1, 9.21, 9.46; 440/12.52, 440/12.54, 12.56, 12.63
See application file for complete search history.

(56) References Cited

U.S. PATENT DOCUMENTS

| | | | | |
|---|---|---|---|---|
| 6,962,221 | B1 * | 11/2005 | Carrette | 180/9.1 |
| 6,981,461 | B1 * | 1/2006 | Burg | 114/67 R |
| 8,622,158 | B2 * | 1/2014 | Leonard | 180/9.1 |
| 2004/0055630 | A1 * | 3/2004 | Olson | 135/901 |
| 2011/0045716 | A1 * | 2/2011 | Schmidt | 440/12.63 |
| 2014/0113512 | A1 * | 4/2014 | Dick | 440/12.52 |
| 2015/0004854 | A1 * | 1/2015 | Hewitt | 440/12.52 |

* cited by examiner

*Primary Examiner* — Tony Winner
(74) *Attorney, Agent, or Firm* — Brian J. Colandreo; Michael T. Abramson; Holland & Knight LLP

(57) ABSTRACT

An apparatus, method and system for utilizing commercial cargo containers is disclosed. The present invention utilizes containers made autonomous by coupling a container with a detachable propulsion system, having a motor and navigation and steering controls, permitting the rapid, controlled, efficient and safe delivery of cargo containers individually by water. Ballast units, deployment systems and control via remote units are also disclosed. The containers, utilizing their inherent buoyancy, can move autonomously according to a preplanned or remote controlled route to a specific location.

4 Claims, 46 Drawing Sheets

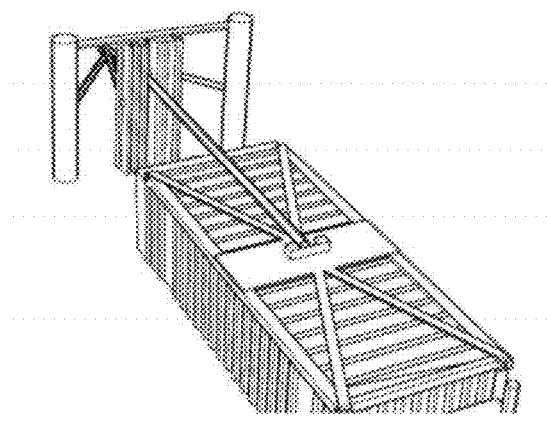
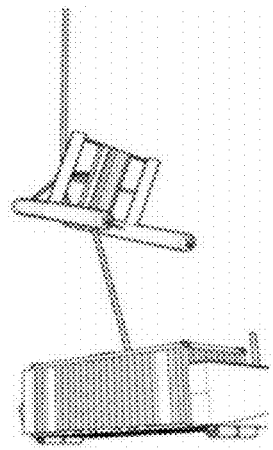
Figure 71A    Figure 71B
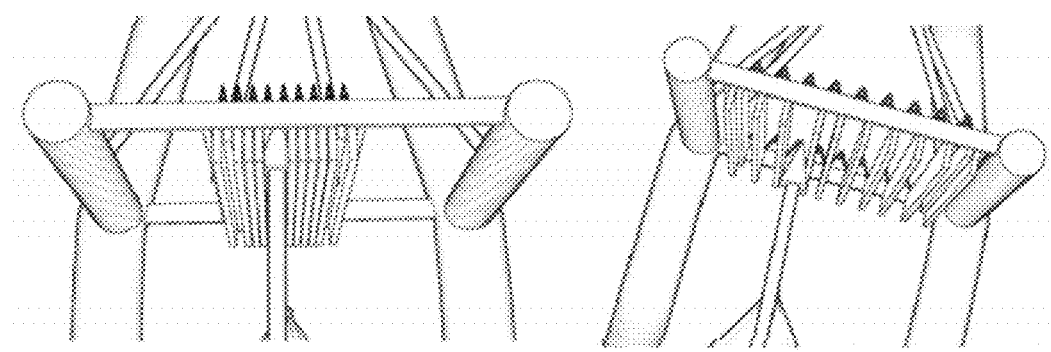
Figure 72

AUTONOMOUS MARITIME CONTAINER SYSTEM

CROSS-REFERENCE TO RELATED APPLICATIONS

This application claims priority to and the benefit of U.S. Provisional Patent Application No. 61/318,811, filed Mar. 30, 2010, U.S. Provisional Patent Application No. 61/318,813, filed Mar. 30, 2010, U.S. Provisional Patent Application No. 61/348,930, filed May 27, 2010, U.S. Provisional Patent Application No. 61/348,948, filed May 27, 2010, U.S. Provisional Patent Application No. 61/348,941, filed May 27, 2010, U.S. Provisional Patent Application No. 61/348,926, filed May 27, 2010, U.S. Provisional Patent Application No. 61/348,916, filed May 27, 2010, and U.S. Provisional Patent Application No. 61/348,904, filed May 27, 2010.

BACKGROUND OF THE INVENTION

There is need for remotely powered autonomous maritime unit that can be utilized in a wide variety of maritime situations and environments. A prior remotely powered structure was disclosed in U.S. Pat. Nos. 7,096,811, and 7,320,289, which are hereby fully incorporated herein by reference. However, there is a need to increase the speed, reduce the drag and enhance their robotic capabilities of such structures to address a wide spectrum of maritime circumstances, such as liquid transfer, oil and debris cleanup, at sea refueling, amphibious operation and repair capabilities. In some situations, such as an oil spill there is also a need for an underwater collection mechanism.

SUMMARY OF THE INVENTION

The present invention addresses the above-identified needs by providing a versatile structure that can robotically cross shoals/sandbars enroute to the beach or the shore, and then be utilized to transport the containers from the water, out of the surf and onto the shoreline/inland; including propulsion and bow units that attach to a commercial shipping container and articulated retractable tracks. The present invention also provides a reduced drag structure including propulsion and bow units that attach to a commercial shipping container and at least a deployable surface panels that can serve to increase buoyancy and to reduce hull drag, and that includes a moveable belt surface to robotically transverse shoals/sandbars enroute to the beach or the shore, and then be utilized to transport the containers from the water, out of the surf and onto the shoreline/inland.

The present invention further provides a shallow water structure, including propulsion and bow units that in one embodiment attach to deployable pneumatic rollers that when deployed, enable the system to robotically transverse shoals/sandbars enroute to the beach or the shore, and then be utilized to transport the containers from the water, out of the surf and onto the shoreline/inland; and in another embodiment includes deployable surface panels that serve increase buoyancy to reduce hull drag and allow shallow water operations; and in a further embodiment includes deployable pneumatic bladder that serves to increase buoyancy and to reduce hull drag by decreasing hull depth and streamlining the bottom surface of the container for shallow water or high speed operations.

The present invention additionally provides sea skimming structure that includes propulsion and bow units that in one embodiment attach to deployable hydrofoil panels, an additional thrust source that can deploy, for example, from the top surface of the propulsion system, and a steering and attitude control to control skimming is via articulating hydrofoil surfaces.

The present invention further provides propulsion and bow units that in one embodiment attach to detachable power supplies that can include an air bladder, navigation system and twin thrusters to facilitate surface recovery. An alternate embodiment includes a bow unit including dual access thrusters for finite attitude control and internal air bladder system for fine depth control, and a propulsion unit with twin articulating thrusters as well as internal bladder system for fine depth control.

The present invention also provides a seabourne platform that includes bow and propulsion units attached to a commercial shipping container that allows linear robotic assembly and disassembly at sea; and that optionally have the capability to sink and resurface on command to provide refueling resources at sea. An alternative embodiment includes telescoping caissons for engagement with the seabed, and a drill apparatus for anchoring the unit to the seabed. In a further embodiment, the structure includes pumps to transfer of liquid products from offshore supply ships to beaches and visa versa, the units include further connectors for connecting to other units via a connector line with booster pumping as needed to deliver the liquid products. The seabourne platform can be fitted with appropriate equipment for robotic firefighting, or solar energy harvesting or wave-energy harvesting. In such an embodiment, the bow unit can include an engine(s) for propulsion and/or powering the fire pumps.

The present invention also provides a structure for oil or debris collection that includes a propulsion and bow unit for transportation or any one of the modified amphibious propulsion and bow units as described above; a container for housing rotary stripper filter belts, deployable rotating ballasting rollers and flexible internal collection bag with an optional deployable boom to enhance oil recovery. An alternate embodiment includes debris collection scuppers and the internal flexible collection bag with a trash compactor assembly. In an embodiment, units can be interconnected with, for example, dual-use floating booms/transfer hoses operating in concert to sweep the surface of a much larger area and directly transfer the contaminants to a pick-up vessel.

The present invention additionally provides remote robotic capability that includes a propulsion and bow unit for transportation or any one of the modified amphibious propulsion and bow units as described above; a container for deploying and retrieving a remotely opeabe submersible unit that can include thrusters and sensors for locating and collection, for example, oil.

The present invention also provides an open access autonomous container structure that includes access cubicles that form individual compartments for man-portable waterproof containers, and a propulsion and bow unit for transportation or any one of the modified amphibious propulsion and bow units as described above and a container such as described in the above example.

The present invention also provides a structure for offboard recovery, including a propulsion and bow unit for transportation or any one of the modified amphibious propulsion and bow units as described above; a container; a robotic ensemble comprising thrusters, flotation chambers, vertically aligned slots that catch and retain attachments on the bow, a retraction tether control/power cable to a recipient ship.

The present invention also provides a structure for remotely repairing breaches, including a sacrificial container that can house an inflatable buoyancy bladder, a ballasting weight and controlled articulating sidewalls, adapters between a propulsion unit such as described above, and the container, where an adapter can be sacrificial and remains with the container, and another adapter can be connected to the propulsion unit, and that releases from the first adapter and to provide a stable hull form for recovery of the propulsion unit. The structure allows the deposit of large permanent plugs in breaches.

BRIEF DESCRIPTION OF THE DRAWINGS

FIG. 71A illustrates aspects of an embodiment of the present invention depicting applications of an ORRS.

FIG. 72B illustrates aspects of an embodiment of the present invention depicting applications of ORRS.

DETAILED DESCRIPTION OF THE PREFERRED EMBODIMENTS

In preferred embodiments of the present invention, a track crawler ASCC is fully functional as a bow unit (to streamline drag in the water when deployed at an angle, such as a 45 degree angle, and enhance seakeeping capabilities) and a stern unit (to provide propulsion, thrust and steering capabilities when fully deployed) en-route to the shore, and then be utilized to transport the containers from the water, out of the surf and onto the shoreline/inland. In preferred embodiment of the present invention, the following components can be included in the Crawler units.

Figure 1:
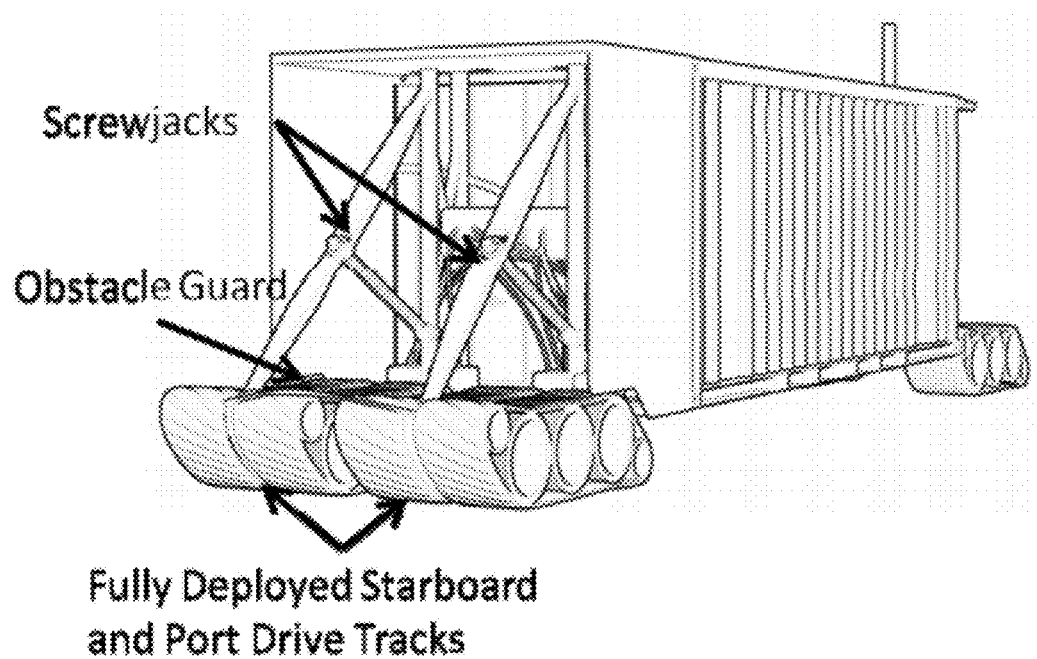
FIG. 1 illustrates aspects of an embodiment of the present invention depicting a fully deployed front crawler bow unit.

Crawler tracks (bow and stern)—Referring to FIG. 1, the geometry and depth of the track rack attached to both the bow and stern units should preferably allow for any ISO or ISO-sized container to sit flat on the deck of a ship for storage when both sets of tracks are stowed. In accordance with a preferred embodiment, when the tracks are deployed (e.g., fully—stern or halfway-bow), the track rack geometry and depth preferably raises the container bottom off the deck, allowing self motivation via tracks aboard ship, and dunnage to be placed under the container prior to disconnecting the units ashore. In accordance with a preferred embodiment of the present invention, prior to the Crawler beaching, the forward tracks preferably transition to a deployed mode (e.g., a fully deployed mode). Deployment of the tracks allows the Crawler to crawl up onto the beach with a reduced ground pressure. The crawler tracks, in embodiments of the present invention, can be independently controlled. Any suitable control can be used as will be recognized by those skilled in the art. For example, a hydraulic distribution manifold or electrical motors could be used. In embodiments of the present invention, each of the tracks can be controlled, such as by independently varying the hydraulic pressure to the track drive motors or by varying electrical power to the separate electric motors allowing the front tracks to steer the unit on land.

Crawler bow unit—A preferred embodiment of the present invention can employ four crawler tracks on the bow unit. The number and configuration depends upon the desired use of the present invention For example, the front crawler tracks could comprise solid rubber ribbon type tracks. Such an implementation of an embodiment of the present invention would streamline hydrodynamics and reduced drag. Those skilled in the art will recognize that other track designs may also be used. In an example embodiment of the present invention, when the tracks are positioned at, for example, a 45 degree angle, the tracks hydro-dynamically emulate a flat bow, thus giving the unit the properties of a flat bow skiff in the water. The tracks on the bow unit can deploy and any suitable angle. An angle of 45 degrees could be useful for waterborne mode and shipboard/land independent movement. An angle of 90 degrees could be used for coming ashore or soft ground movement on land. The angle of deployment depends upon the use of a unit in accordance with the present invention. The angle of deployment can be effected by any suitable mechanism such as hydraulics and electric motors, and suitably driven screwjacks. In an embodiment utilizing screwjacks, reversing the screwjacks would allow the tracks to fold back to the stowage and assembly position, such as a vertical position. The speed of the bow unit tracks can be independently controlled to allow full steering capability with a simple pivoting mount of the paired dual front tracks.

Figure 2:
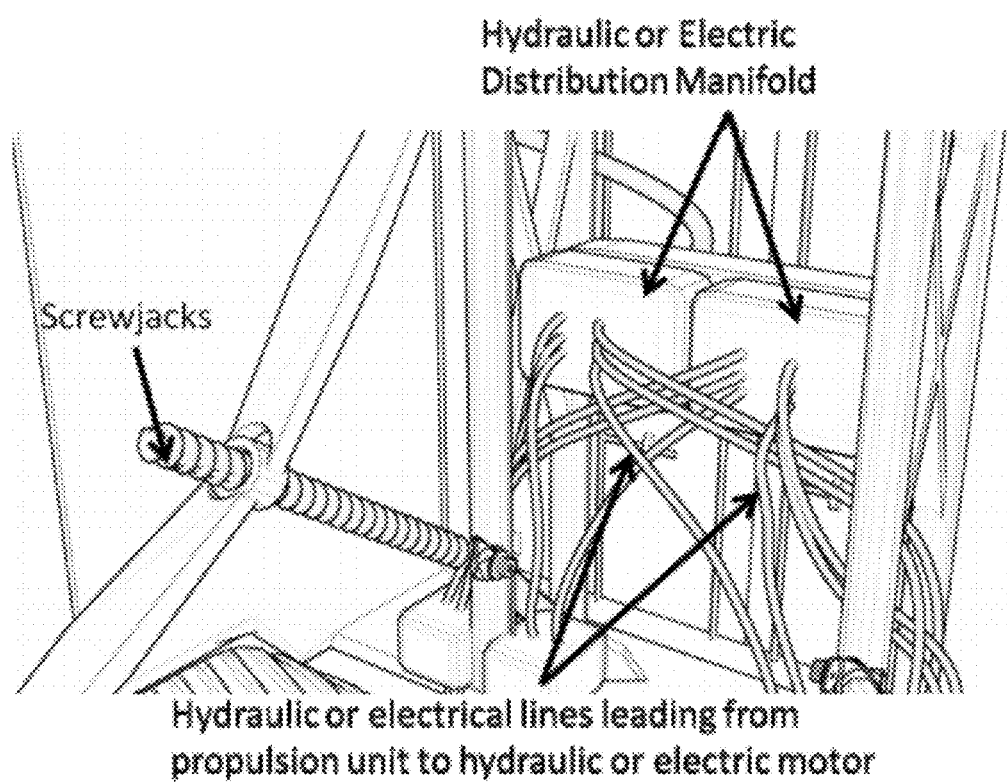
FIG. 2 shows an aspect of an embodiment of the present invention for controlling tracks of a crawler.
Figure 3:
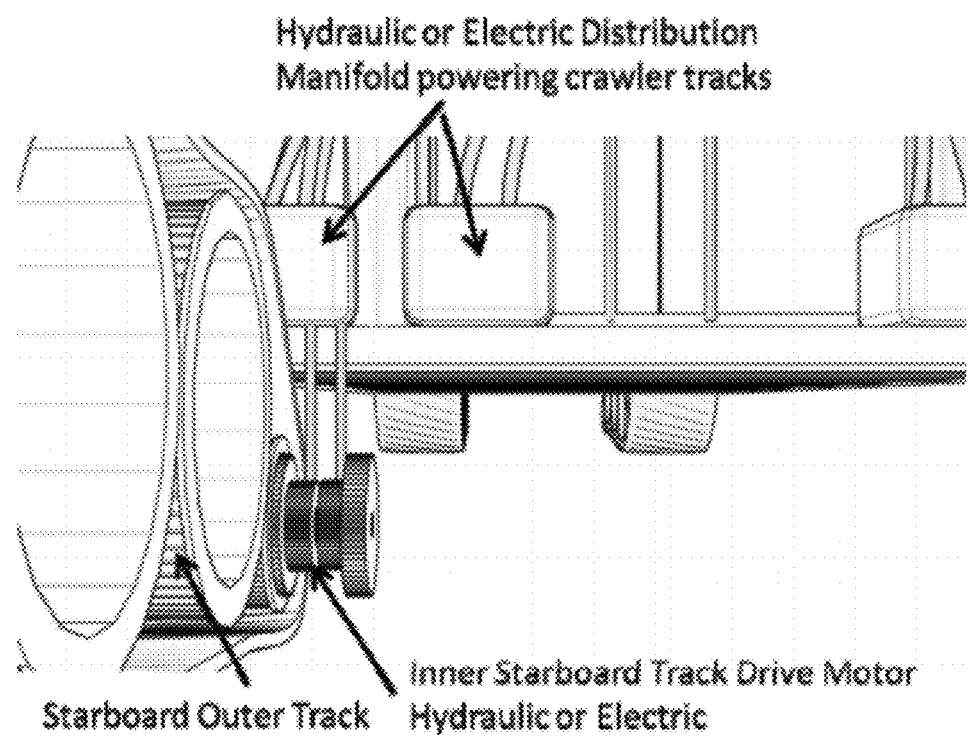
FIG. 3 shows an aspect of an embodiment of the present invention for controlling tracks of a crawler including a bow unit distribution manifold and tracks.
Figure 4:
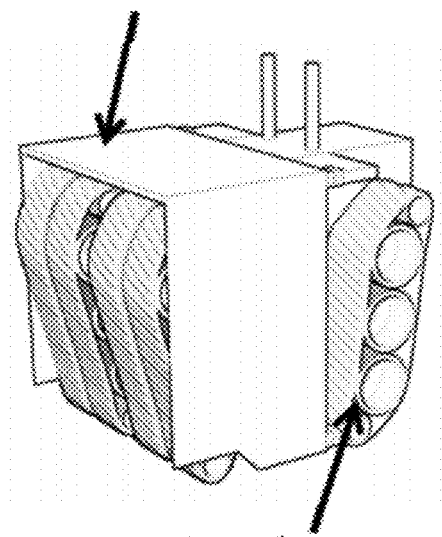
FIG. 4 illustrates an aspect of an embodiment of the present invention depicting a stowed configuration of both bow and stern units.
Figure 5:
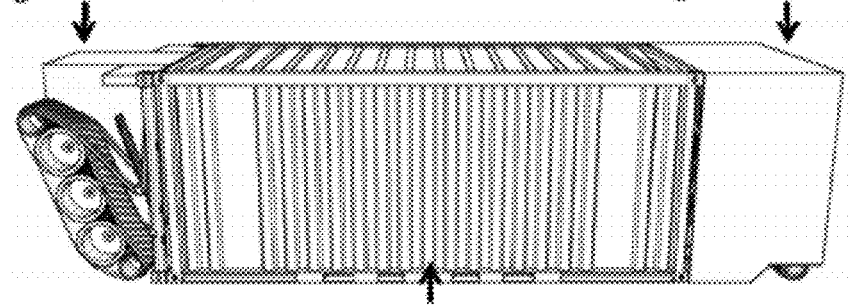
FIG. 5 illustrates an aspect of an embodiment of the present invention depicting a stowed configuration of bow and stern unit attached to ISO sized container.
Figure 6:
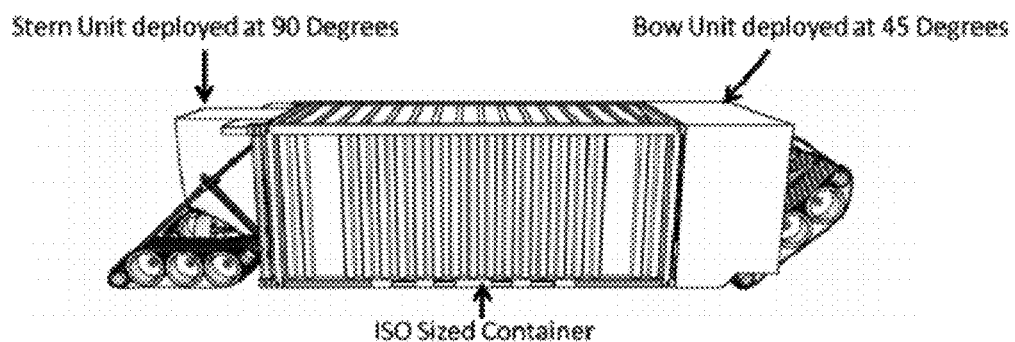
FIG. 6 illustrates an aspect of an embodiment of the present invention depicting a deployed configuration of bow and stern unit attached to ISO sized container in water.
Figure 7:
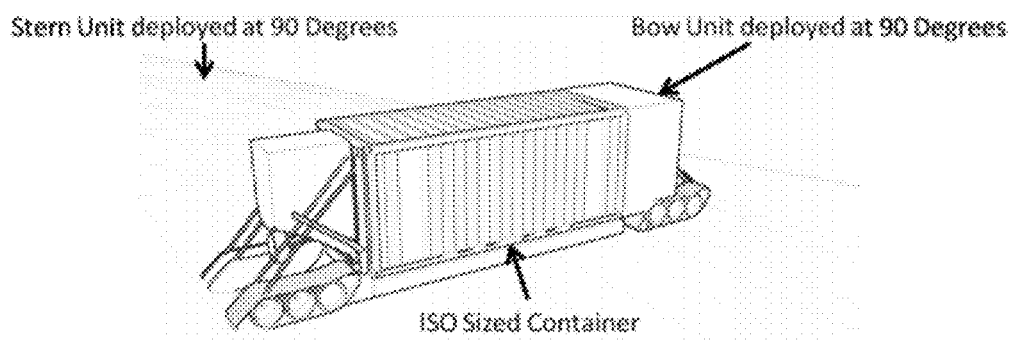
FIG. 7 illustrates an aspect of an embodiment of the present invention depicting a deployed configuration of bow and stern unit attached to ISO sized container on land.

Crawler stern unit—In a preferred embodiment of the present invention, the stern unit can propel the Crawler ASCC through the water. There are a variety of propulsion methods. Some suitable methods include: (a) Deploying azipod (e.g., either hydraulic, electric or mechanically driven), (b) Kort Nozzle and standard rudder or (c) a standard propeller and rudder system. For embodiments of the present invention utilizing a combustion engine to drive the stern unit, (e.g., versus as other power sources such as an electrical drive), there should be adequate cooling. For example, a dual cooling system can be employed. Examples can include: (a) when the Crawler is in the water, the cooling system may be liquid to liquid, and (b) when the Crawler is on land, the cooling system would preferably be a liquid to air system in order for the Crawler to provide extended range capabilities. The propulsion unit preferably transfers power to front units via hydraulic lines or electric power lines. The propulsion unit also includes tracks, such as two tracks on either side of an inline engine or electric motor, and can utilize a hydraulic or electric motor or mechanical coupling to power the tracks that remain fixed and preferably do not pivot. As illustrated by the exemplary embodiment discussed herein, the tracks on the propulsion unit deploy fully (e.g., 90 degrees) via screwjacks or fold back into the propulsion unit when stowed. Reversing the screwjacks allows stowage eases and attachment of the ensemble to the ISO shipping container through the use of material handling equipment. As will be recognized by those skilled in the art, sensors (e.g. sonic, infrared) can be used to allow the Crawler unit sense and avoid obstacles by "steering around" sensed obstacles while on land or in the water. FIG. 2 and FIG. 3 show exemplary embodiments for controlling the tracks of the crawler (electrical motors can be substituted for the hydraulic motors shown in the figures below). As seen in FIGS. 1 and 2, screwjacks can be used to deploy the tracks. Operation of the screw jacks and be implemented in any known manner. As shown in FIG. 2, the screwjacks can be driven by hydraulics or electric motors, via, for example, a hydraulic of electric control distribution box. FIG. 3 shows an exemplary aspect for driving the tracks via gears. Other drive mechanisms can be used depending upon the application, such as chains, belts and a fluid transmission.

FIG. 4 through FIG. 7 show example modes of deployment from stowage aboard ship to attachment to any ISO sized container to the waterborne configuration (bow unit at 45 degree angle, stern unit at 90 degree angle), and finally to the fully deployed land configuration (bow unit and stern unit both at 90 degree angle).

In preferred embodiments of the present invention, a belt crawler unit can have many functions. Example functions include achieving "planing" by reducing hull drag. There are many ways to reduce hull drag, including increased buoyancy and providing a greater planing surface, reducing horsepower requirements. Another exemplary function is to allow the ASCC to function as an amphibious unit by transporting the containers from the water, out of the surf and onto the shoreline/inland through the rotation of the individual belts.

Figure 8:
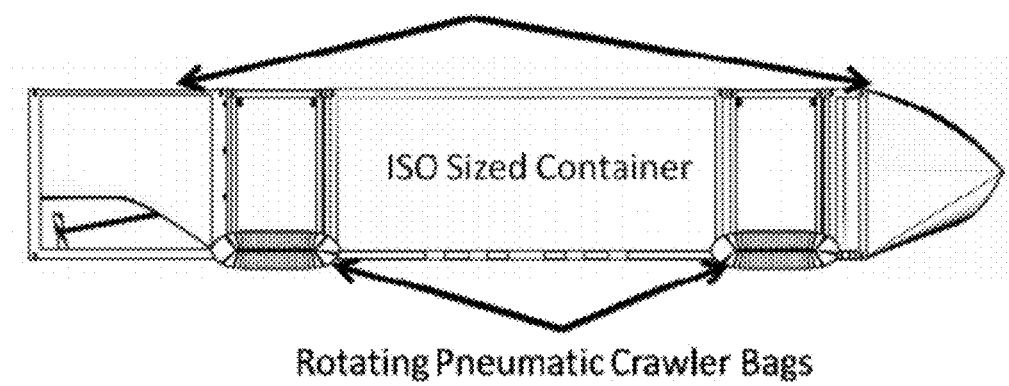
FIG. 8 illustrates aspects of an embodiment of the present invention depicting belt crawler components.
Figure 9:
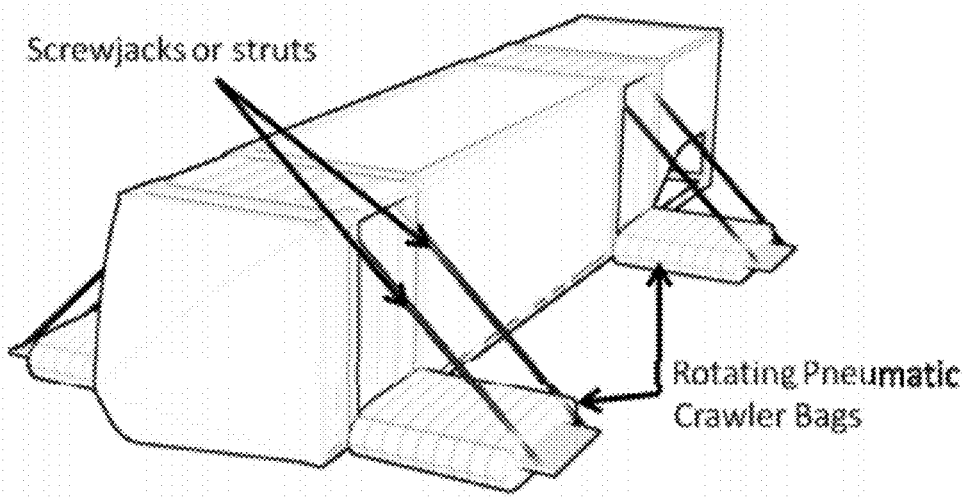
FIG. 9 illustrates aspects of an embodiment of the present invention depicting a belt crawler.

Referring to FIG. 8, in an exemplary embodiment, a pneumatic crawler deployment includes side deploying hydrofoils with pneumatic bags. The pneumatic crawler bags can be installed around the hydrofoils that are stored in and deployed from an insertable modular unit as shown in FIG. 8. Deployment can be initiated based on a deployment signal from the ASCC propulsion unit. Deployment can be in any known manners, such as, the hydrofoils rotating open and moving down into a plane position. In an exemplary embodiment, the pneumatic crawler bags are inflated to an appropriate pressure. As shown in FIG. 8, as the bags inflate, the varying air chambers of each individual bag form the "air spokes" and treads that can be used to traverse a land environment. Once the bags are properly inflated, a hydraulic/electrical motor inside the insertable modular unit drives the pneumatic crawler bags around each individual hydrofoil, acting like a wide track. The buoyancy added by pneumatic bags would allow the ASCC system to ride higher in the water and operate in shallow waters, such as shown in FIG. 9. The rotating pneumatic crawler bags can also allow the ASCC system to crawl up onto the beach and to transverse soft soil/mud/shoals.

Figure 10:
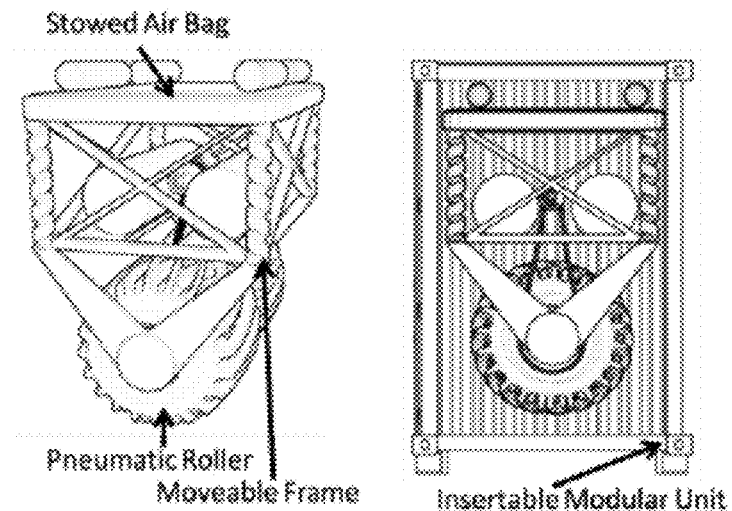
FIG. 10 illustrates aspects of an embodiment of the present invention depicting a roller crawler insertable modular unit.
Figure 11:
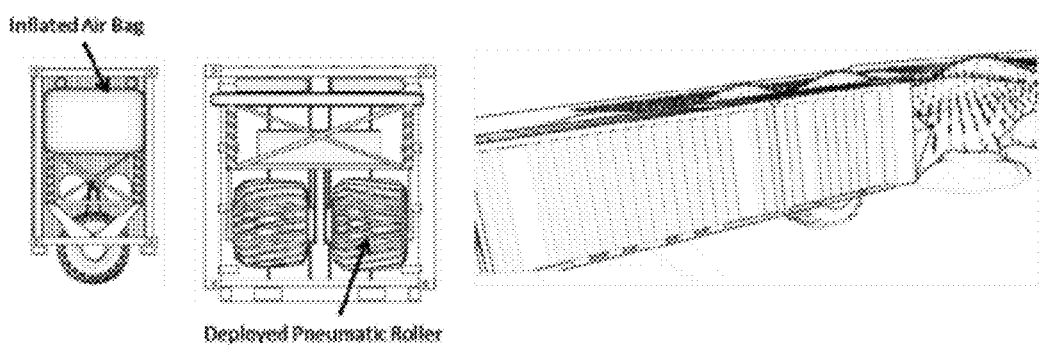
FIG. 11 illustrates aspects of an embodiment of the present invention depicting a deployment process for roller crawler unit.

Referring to FIG. 10, preferred embodiments of the present invention can include a pneumatically deployed roller inside a moveable frame, located within an insertable modular unit. The unit is lowered to an appropriate level to aid beaching. It is preferred that the lowering is such that the center of gravity is controlled to avoid rollover of the entire system. The pneumatic roller can be constructed out of a material that is suitable for soft beach landings, and will have a sufficiently large diameter to allow for a greater ground interaction area. For example, a material similar to those used in Aero Tec Laboratory's Drop Drum Fuel Bladder, with a larger diameter and possessing treads for soft terrain interaction. In the illustrated embodiment, the moveable frame structure houses pressure vessels (e.g., air storage tank, and an air bag for deployment of the frame structure), an electronic controller, including, for example a control unit and an antenna for remotely initiated deployment. When full deployment of the frame is achieved, electronic controller initiates rolling of the pneumatic powered roller. The rolling will be facilitated through the use of suitable drive mechanisms, such as pneumatic motors powering a gear reduction system to transfer the mechanical energy to the rollers. In this illustrative embodiment, compressed air can drive the pneumatic motors. Compressed air can be stored in the vehicle and it is desired that the amount of stored compressed air be suitable to allow the roller crawler unit to totally emerge from the water for container delivery as illustrated in FIG. 11.

In preferred embodiments of the present invention, it is envisioned that a shallow water ASCC units can be utilized for shallow water operations (e.g., less than 3 ft) to allow the ASCCs to approach the shoreline in shallow gradient beaches or to transfer across shoals or reefs. These same design features can be used to assist in planing the ASCC system. As will be recognized by those skilled in the art, to aid in planing, more powerful propulsion units are needed to provide sufficient speed for the ASCC.

Figure 12:
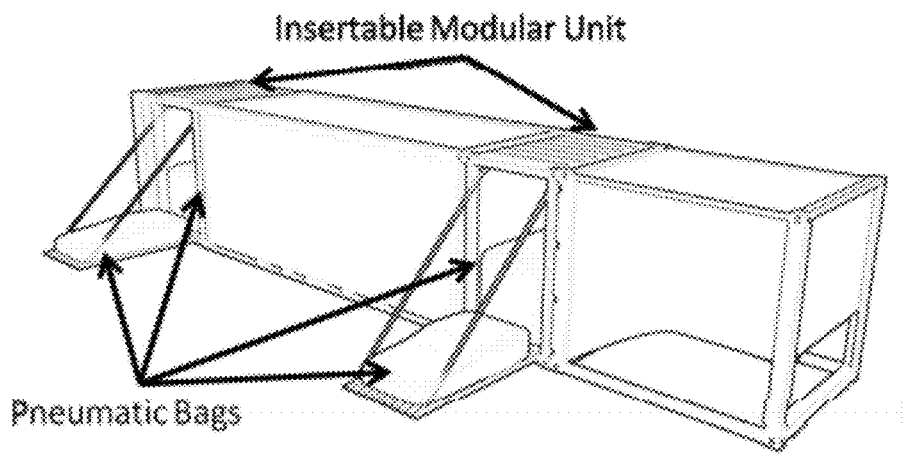
FIG. 12 illustrates aspects of an embodiment of the present invention depicting a shallow water operation ASCC in a water mode.

FIG. 12 illustrates aspects of an embodiment of the present invention depicting a shallow water operation ASCC in a water mode. The FIG. 12 embodiment, a shallow water insertable modular units are respectively attached between the ASCC bow and stern units and the commercial container. In a representative embodiment, the shallow water insertable modular units include pneumatic bags, a compressed air storage source or an electric or diesel powered compressor suitable to pump the bags to a correct pressure, and a wired or wireless connection to the ASCC propulsion unit for at sea deployment. One or more modular units can be connected to the ASCC system via commercially available connectors as shown in FIG. 12. For example, suitable TANDEMLOC connectors could be used.

In this example embodiment, once the ASCC system is enroute to its destination, a control unit for the ASCC propulsion unit sends a signal to the shallow water insertable modular units to initiate inflation of the enhanced flotation pneumatic bags, and the deployment of the hydrofoil sections (e.g., hard surface down), such as a position level with the bottom of the container.

The sequence of the initiation process includes: deploying the side walls of the shallow water insertable modular unit from their fixed position via, for example, screwjacks or other suitable mechanisms. The sidewalls can include the pneumatic bags, which inflate when deployed in any known manner. The compressed air source then fills the pneumatic bags to an appropriate pressure, e.g., suitable pressure to withstand impact forces from the environment. As the pneumatic bags fill with air, the side walls of the insertable modular unit, which rotate about the bottom edge of the insertable modular unit, are forced down. The side walls eventually reach a maximum rotation of, for example, 90 degrees from their original positions and are perpendicular to the vertical walls of the insertable modular unit. It is preferred that the side walls be locked in place upon deployment using any common locking mechanism.

In operation, upon deployment as described above the pneumatic bags would commonly be submerged under the water to provide an enhanced degree of buoyancy and roll stability. The buoyancy provided by the pneumatic bags exerts an upward force on the ASCC, reducing its draft, and thus the water depth required by the ASCC. This allows for the ASCC to operate in a very stable manner in shallow waters and may also assist in achieving planing. The reduced hull drag from this shallow water configuration eliminates a significant amount of the power requirements for higher speed operations.

Figure 13:
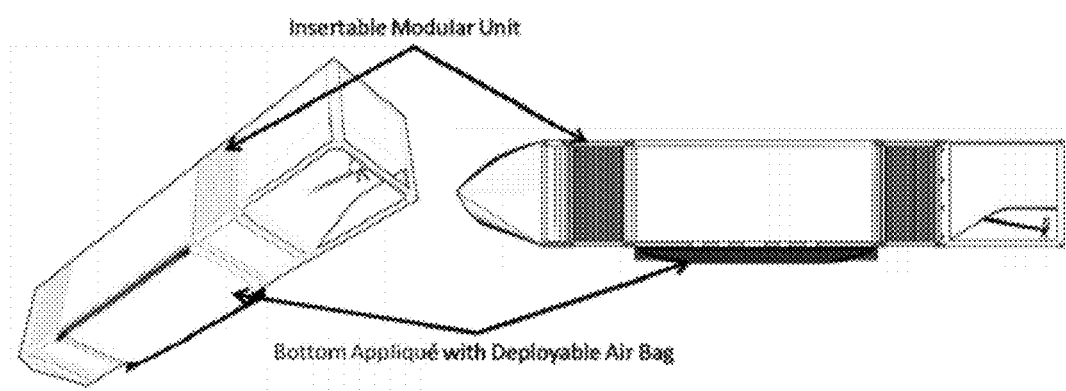
FIG. 13 illustrates aspects of an embodiment of the present invention depicting a bottom appliqué including a deployable air bag.

FIG. 13 illustrates aspects of an embodiment of the present invention depicting a bottom appliqué including a deployable air bag. This design allows enhanced shallow water ASCC unit operations by increasing buoyancy, as well as provide a smooth hull surface on the bottom of the ASCC for "planing" or decreased fuel usage if, for example, planing is not utilized.

In the FIG. 13 embodiment, the bottom deploying air bag is an appliqué that attaches to the ISO hold-down receptacles underneath or on the bottom of a common modular ISO-sized container being transported by the ASCC system. If the airbag is not deployed, it can serve to reduce drag by serving to smooth the bottom of the "hull" of the container as shown in FIG. 13. If deployed, it provides a smooth surface and increases buoyancy of the entire ASCC system. In this embodiment, the bottom deploying air bag has a self contained compressed air source and can be either manually deployed, or remotely deployed by the propulsion unit sending an initiation signal to the bottom bag similar to that described above.

Figure 14:
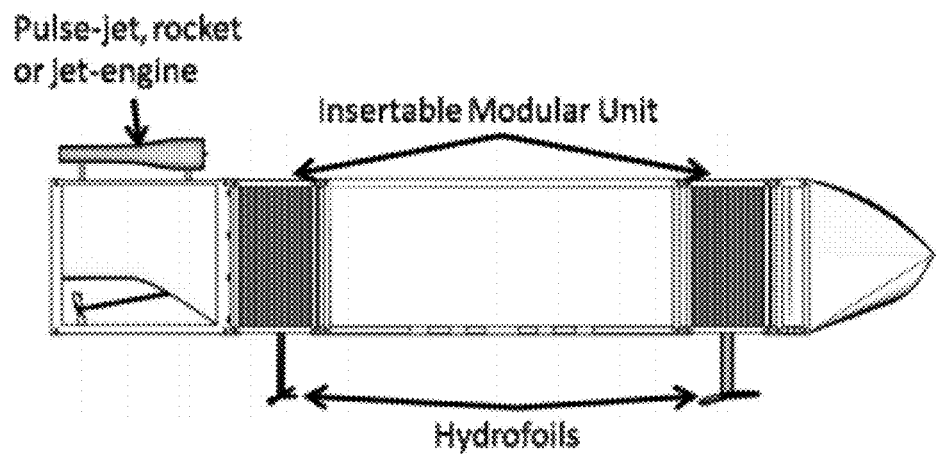
FIG. 14 illustrates aspects of an embodiment of the present invention depicting a sea skimming ASCC.

FIG. 14 illustrates aspects of an embodiment of the present invention depicting a sea skimming ASCC. As seen in FIG. 14, this embodiment includes a hydrofoil. To provide power sufficient to utilize the hydrofoil, the ASCC needs to have sufficient propulsion (e.g., 30 kts), such as can be provided by, for example, a pulse-jet, rocket, or jet-engine As illustrated in FIG. 14, an insertable modular unit encloses a hydrofoil system. The hydrofoil system can include the mechanism for lowering and raising the hydrofoil, and if desired a wireless communication and controller for remote deployment. Upon receiving a deployment signal from, for example, the ASCC propulsion unit, the deployment system lower the hydrofoils into the water. While the ASCC system is travelling at low speeds, the hydrofoils are completely submerged in the water as in known to those skilled in the art.

Figure 15:
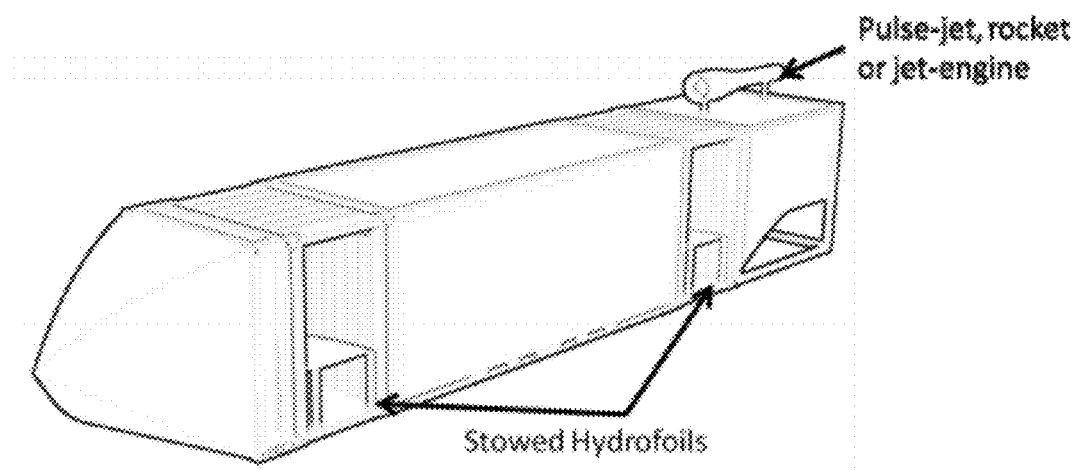
FIG. 15 illustrates aspects of an embodiment of the present invention depicting a sea skimming ASCC with stowed side deploying hydrofoils.
Figure 16:
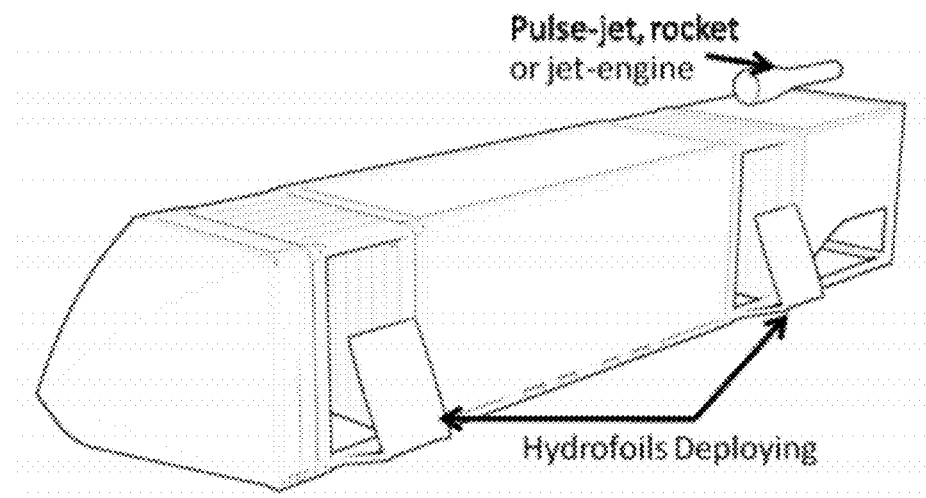
FIG. 16 illustrates aspects of an embodiment of the present invention depicting a sea skimming ASCC with hydrofoils being deployed.
Figure 17:
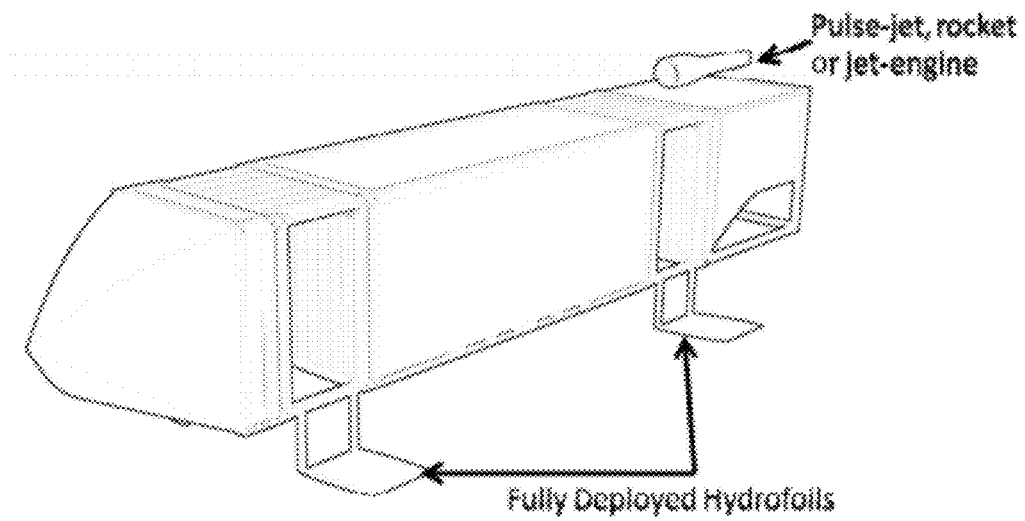
FIG. 17 illustrates aspects of an embodiment of the present invention depicting a sea skimming ASCC with fully deployed side hydrofoils.

FIGS. 15 through 17 illustrate aspects of an alternate embodiment including hydrofoils. In this alternative embodiment, the hydrofoils deploy from sides of the insertable modular unit insert rather than lowering directly down from the bottom of the insert as in the FIG. 14 embodiment. This allows much larger hydrofoils to be utilized if needed. FIG. 15 through FIG. 17 depicts a sequence of steps to deploy the hydrofoils from the sides of the insertable modular unit.

Figure 18:
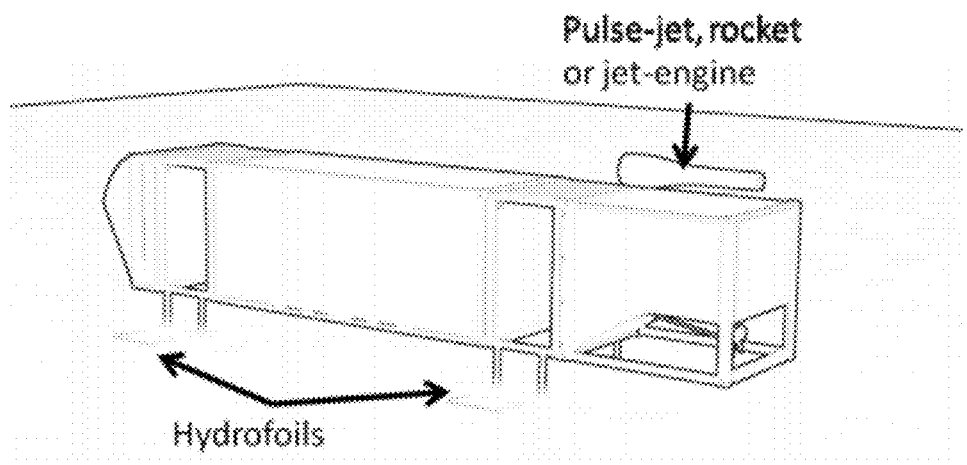
FIG. 18 illustrates aspects of an embodiment of the present invention depicting a waterborne sea skimming ASCC.
Figure 19:
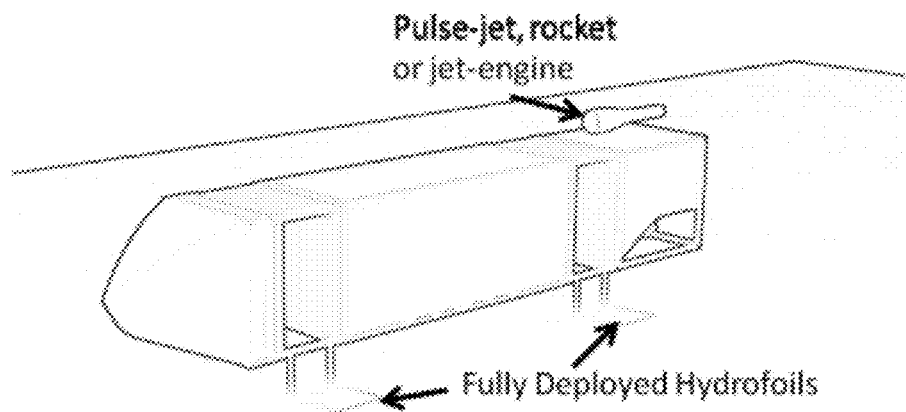
FIG. 19 illustrates aspects of an embodiment of the present invention depicting a waterborne sea skimming ASCC with fully deployed side hydrofoils.

As seen in FIGS. 14, 15, 18 and 19, the ASCC propulsion unit can include a pulse-jet, rocket or jet-engine. Such a power supply can be deployed from and/or attached to the top surface of the ASCC, and assists to achieve higher speeds. As the ASCC's speed increases due to the additional thrust from the pulse-jet, rocket or jet-engine, the hydrofoils will generate an increased force, lifting the ASCC from the water, further decreasing drag and allowing the system to reach much higher speeds. One or both of the hydrofoils can be segmented and articulated to allow control of pitch, roll and steering while the ASCC is out of the water such as illustrated in FIG. 18.

Figure 20:
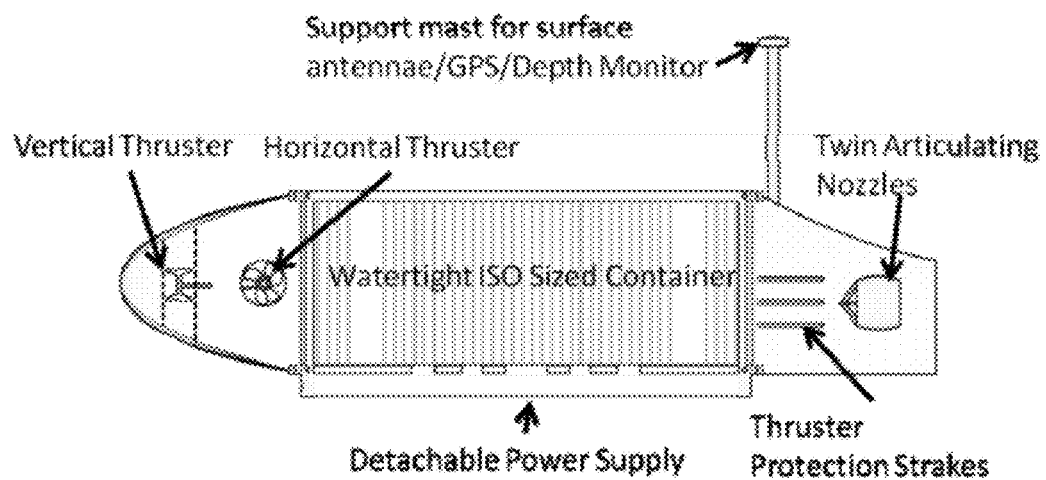
FIG. 20 illustrates aspects of an embodiment of the present invention ASCC that is submersible.
Figure 21:
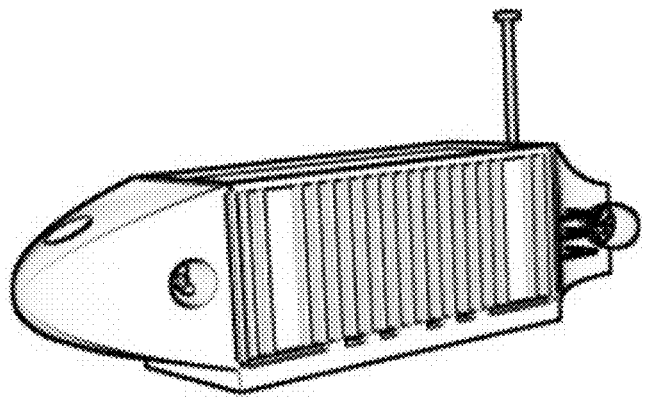
FIG. 21 illustrates aspects of an embodiment of the present invention depicting an underwater ASCC utilizing the bow and stern thrusters to level attitude.
Figure 22:
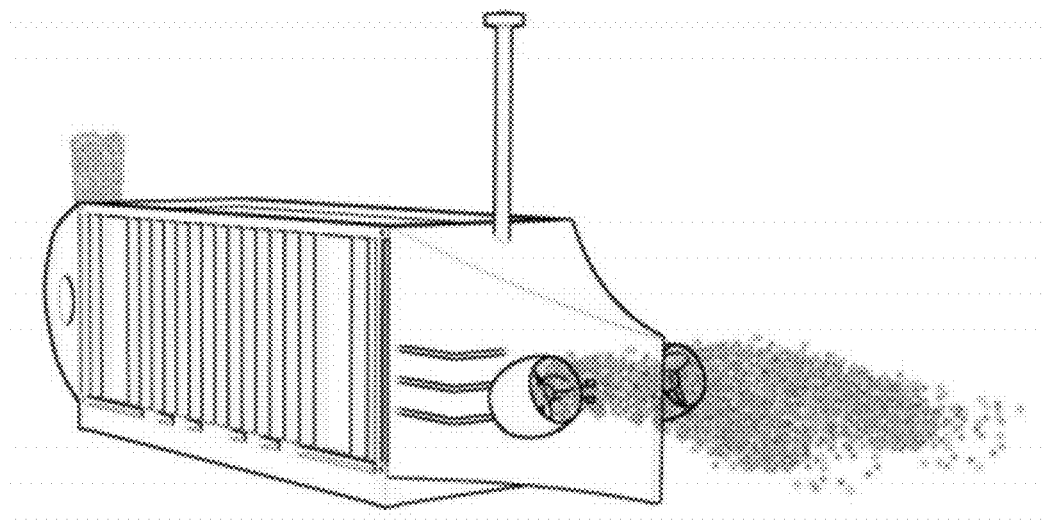
FIG. 22 illustrates aspects of an embodiment of the present invention depicting an underwater ASCC utilizing the twin articulating nozzles to control attitude.

FIG. 20 illustrates aspects of an embodiment of the present invention depicting an ASSC that is submersible. It is envisioned that this embodiment of an ASCC allows the ASCC to function as a submersible unmanned underwater vehicle ("UUV"). In this embodiment, the ASCC can be powered by power modules (batteries, fuel cells, etc) that can be detachable. The submersible embodiment preferably includes the following components.

1. Bow unit—The bow unit preferably includes an air bladder. When deflated this bladder allows an influx of seawater, reducing the buoyancy of the ASCC and allowing it to sink. Preferably, the air bladder can also be inflated to purge the bow unit of sea water, providing increased buoyancy causing the underwater ASCC to rise to the surface as desired. It is preferred that the bow unit include horizontal and vertical thrusters as shown in FIG. 20. This arrangement allows underwater attitude to be controlled in 3 ways: (1) statically—control by a balance of the fore and aft air bladders, coupled with the inherent buoyancy of the container, (2) dynamically—via the power to the vertical thruster and the aft propulsion unit twin articulating vertical motion nozzles, and (3) and dynamic flow—caused by the motion of the unit underwater. Steering can be accomplished various ways. For example, power to the horizontal bow thrusters can be used to control the direction of travel. Also, Differential thrust from the twin articulating nozzles can be used.

2. Propulsion unit—The propulsion unit preferably includes twin articulating vertical motion nozzles. These allow for increased maneuverability of the ASCC. Lateral steering of the ASCC can be effected via, for example, differential thrust. Momentary upsets due to underwater current action and maneuvering can be compensated using rear thrusters and the vertical bow thruster. The propulsion unit can also include an air bladder. The propulsion unit preferably includes either (1) a Mast mounted GPS navigation antenna that also functions as a depth monitor or (2) internal inertial navigation system (INS) and pressure depth monitor system in order to allow for covert movements without any surface disturbance.

3. The ASCC must be negatively buoyant, achieved by the combat load of the container, versus the buoyancy of the container, plus the additional load of one or more detachable power modules. The neutral buoyancy underwater is achieved with the fore and aft airbladders located in the propulsion and bow units. Surfacing of the underwater ASCC can be achieved by, for example, jettisoning one or all of the detachable power modules. Note that in the propulsion unit, there is also preferably a small power supply to power the control unit. The size of the air bladders is limited to the internal volume available in the bow and propulsion unit, excluding thruster ductwork and an air storage tank and compressor motor for the working air.

Figure 23:
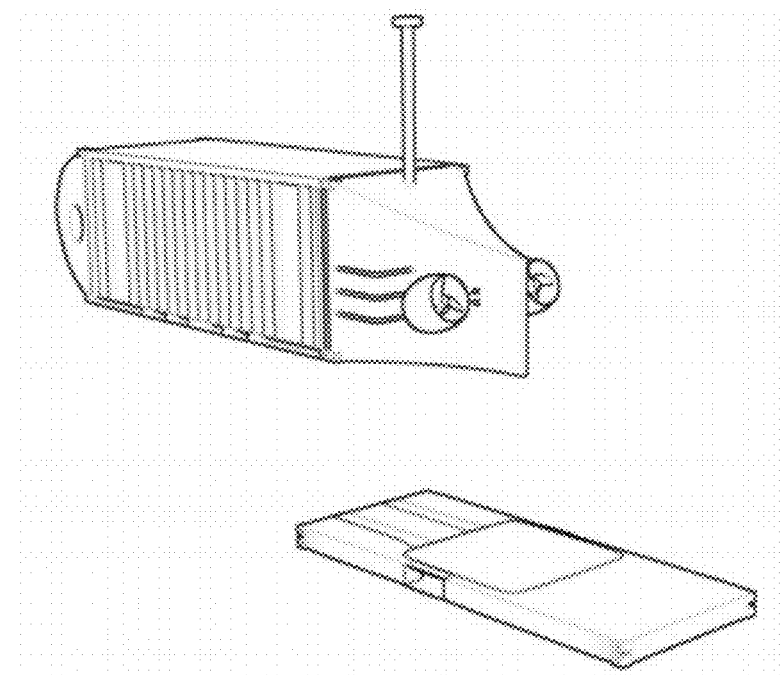
FIG. 23 illustrates aspects of an embodiment of the present invention depicting an underwater ASCC detaching the power supply(s) in order to surface.

4. Detachable power supply(s)—The detachable power supply(s) are preferably mechanically attached to the ISO hold-down receptacles available on the bottom of the container of the underwater ASCC utilizing standard ISO connectors. The number of power modules required depends on a number of factors, such as (1) the inherent buoyancy of the container and the buoyancy capabilities of the ballasting air bladders in the propulsion and bow units, and (2) the desired range, latency period and on station time. If multiple power supplies are not required, simple ballasting modules can be utilized in their place. The power supplies are preferably mechanically and attached to the bottom of the ISO container, and are electrically coupled to the ASCC electrical system. Once the ASCC is ready to surface, the power supplies will be released via a release mechanism from the container, allowing the additional weight of the ASCC to be lightened as shown in FIG. 23.

Figure 24:
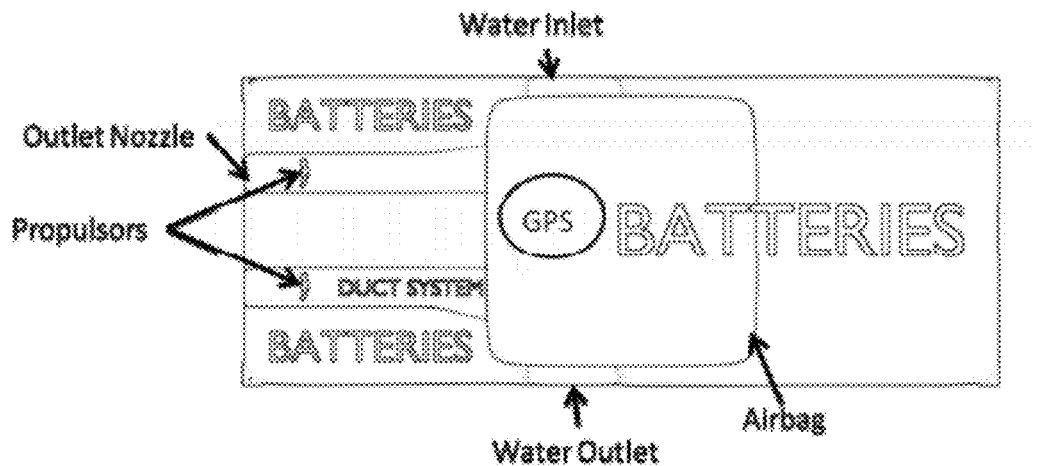
FIG. 24 illustrates aspects of an embodiment of the present invention depicting a detachable power supply.
Figure 25:
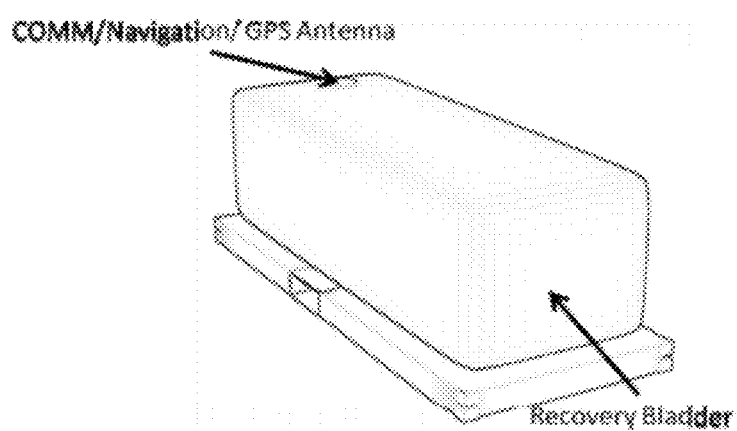
FIG. 25 illustrates aspects of an embodiment of the present invention depicting a detachable power supply-deployed recovery bladder.

Referring to FIGS. 24 and 25, the power supplies preferably include a recovery flotation bladder (with a self included pressurized air supply), and electric propulsors imbedded within the module having a water inlet and an outlet. By inflating the recovery flotation bladder via internal air supplies, the detachable power module(s) can resurface, and autonomously navigate to a recovery area or rendezvous with a pickup ship. An optional GPS antenna may be mounted to the top surface of the recovery air bladder providing situational awareness to the internal navigation unit.

5. The propulsion, bow, watertight container and detachable power supply units can be connect via standard ISO connectors. It should be noted that a non-water tight container can be utilized with the utilization of standard marine waterproofing wrap (shrink wrap) applied over the outer surface of the container and bonded to the container with the application of heat as described below.

By utilizing commercial International Standards Organization "ISO" sized containers with bow and propulsion units mechanically attached (see descriptions below), a seabourne autonomous mobile platform ("SAMP") with a flat top surface could be formed either manually or autonomously into a structurally rigid waterbourne platform, supporting topside activities such as helicopter landings, refueling and small craft operations. It is envisioned that multiple SAMPS could be mechanically assembled either manually or autonomously to create large platforms at sea that remain maneuverable as an ensemble. This design also allows for robotic disassembly and reassembly of the autonomous waterbourne platform at another location.

It would be advantageous to have an ISO sized container (hereafter called SAMP unit) of 8 ft by 9 ft by 20 ft size in order to provide increased structural rigidity and additional buoyancy, however, 8 ft×8.5 ft×20 ft ISO sized containers could also be used if fleet compatibility requirements are desirable. The actual size of the container is not material to the invention and can be any suitable size depending upon the application.

Figure 26:
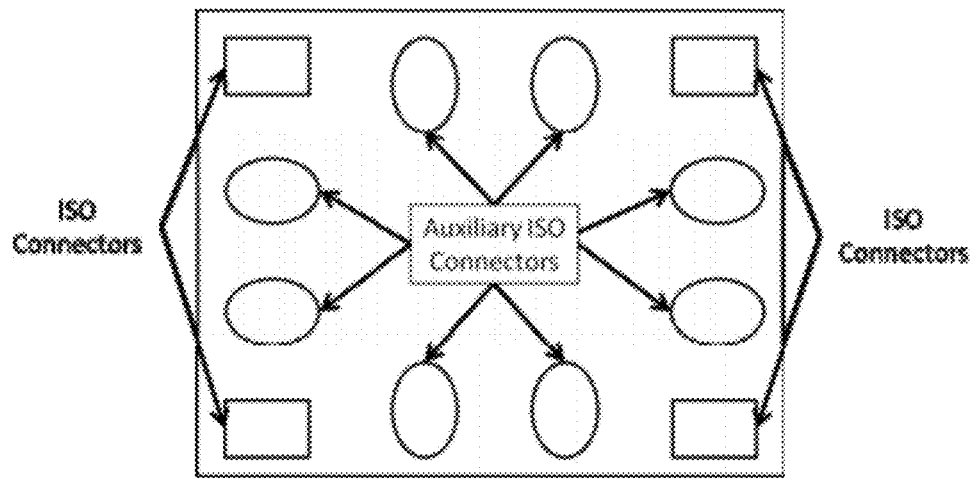
FIG. 26 illustrates aspects of an embodiment of the present invention depicting a forward view of a seaborn autonomous mobile platform ("SAMP") propulsion unit and aft view of SAMP bow unit.
Figure 27:
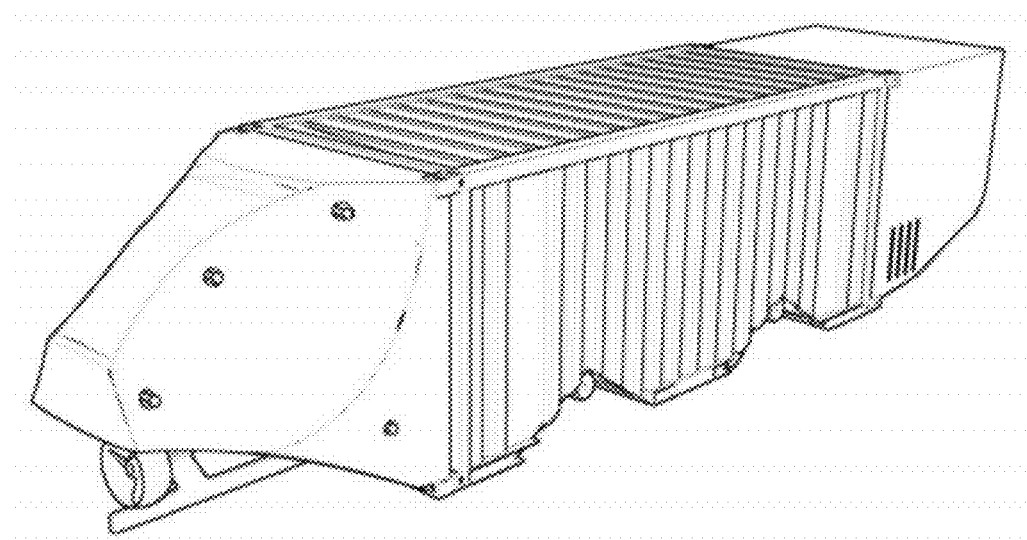
FIG. 27 illustrates aspects of an embodiment of the present invention depicting a seaborne autonomous mobile platform unit.

To connect the bow and propulsion units to the SAMP unit, the amount of weight that will load the topside of the SAMP, and the stresses induced into the structure by wave action should be taken into account in the coupling design. A configuration for the ISO connectors on the SAMP unit as shown in FIG. 26 is preferred in order to mechanically connect the bow and propulsion units to the SAMP unit. The same configuration will preferably be on the bow and propulsion units in order to enable the mechanical connections. By having additional auxiliary ISO connectors on a special frame, the shear and tension caused by the weight on the topside as well as the stresses induced into the structure by wave action can be absorbed by the connectors, and allow the SAMP to be structurally rigid fore and aft. The auxiliary ISO connectors can be removable which greatly improves the utility of the individual units. The number of auxiliary ISO connectors used in the special frame is adjustable depending on the shear and tension caused by the weight on the topside of the SAMP, as well as the stresses induced into the structure by wave action.

Figure 28:
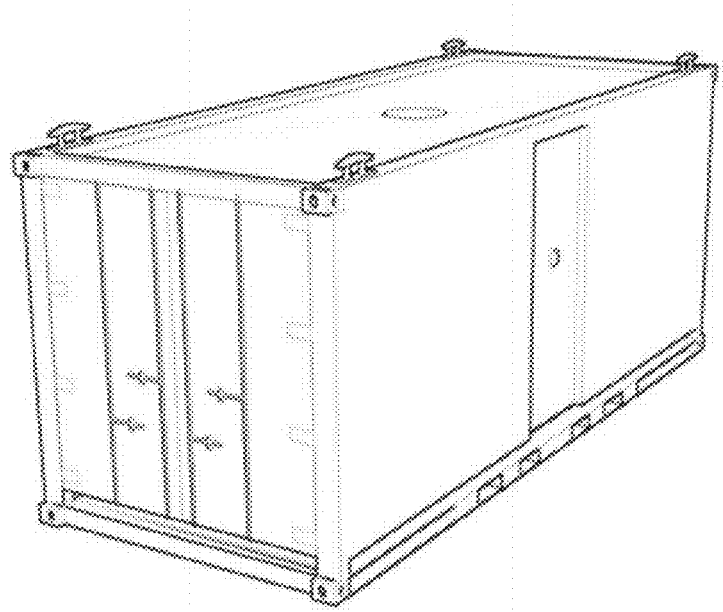
FIG. 28 illustrates aspects of an embodiment of the present invention depicting a SAMP module unit.
Figure 29:
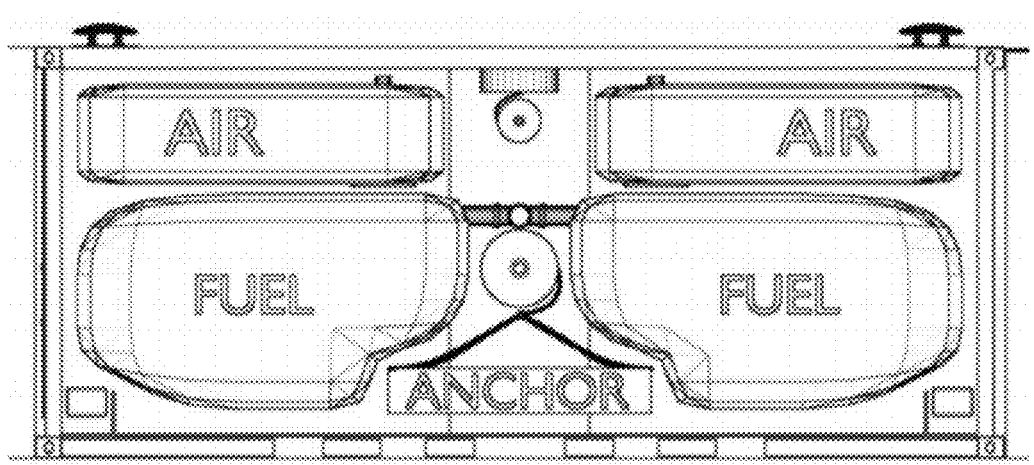
FIG. 29 illustrates aspects of an embodiment of the present invention depicting an interior view of a SAMP module unit.

The exemplary embodiment of a module unit of the SAMP as seen in FIG. 28 and FIG. 29 includes two air bladders, two interconnected fuel tanks with connectors on each side of the module, two battery packs at the front and back of the module, a buoy, and an anchor attached to a winch. The two air bladders, powered by battery powered air pumps, are able to inflate or deflate upon command (e.g., from the propulsion unit control unit) to assist in the ballasting the SAMP. The two fuel tanks are connected together so that when fuel is pumped in or out, it is done uniformly to ensure the levelness of the SAMP. The two battery packs power the winch of the anchor to enhance stability and also the deployment of the buoy.

Figure 30:
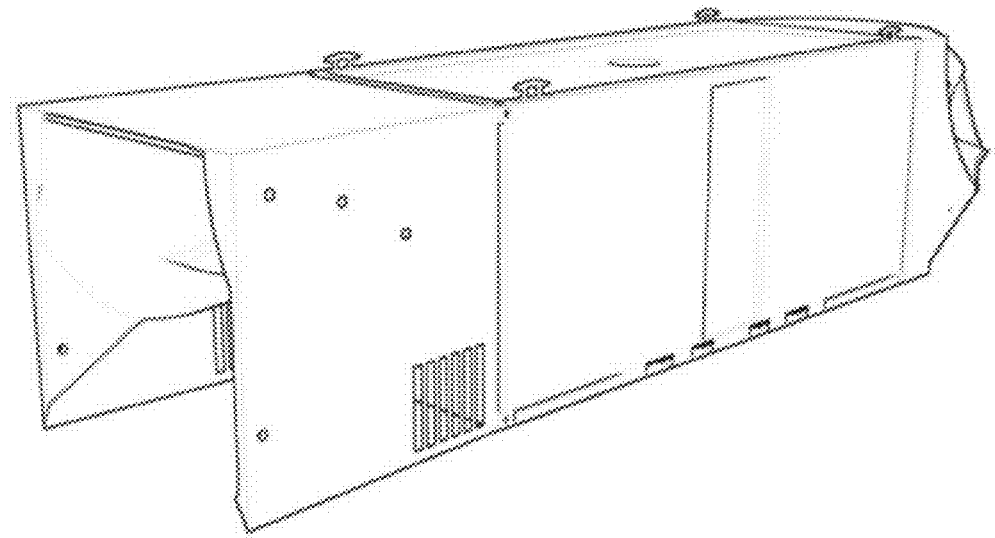
FIG. 30 illustrates aspects of an embodiment of the present invention depicting a SAMP propulsion unit.
Figure 31:
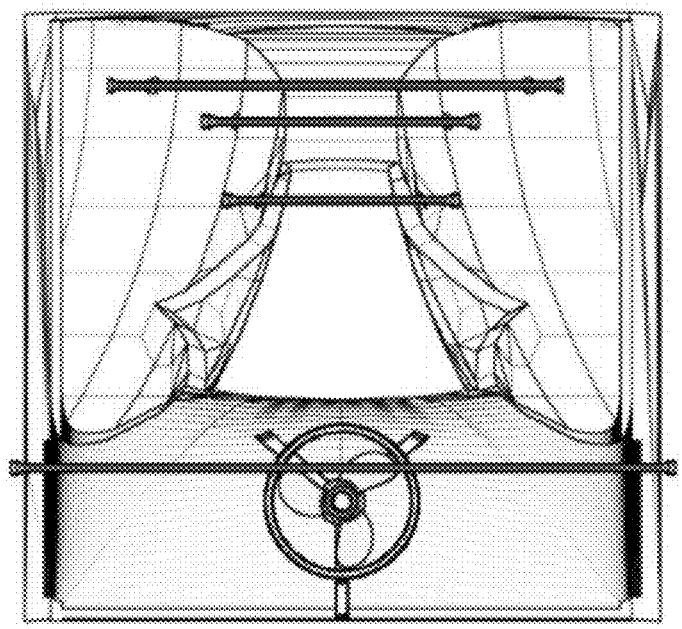
FIG. 31 illustrates aspects of an embodiment of the present invention depicting a SAMP bow unit.

In order for the bow and propulsion units to be connected to the SAMP unit, the amount of weight that will load the topside of the SAMP, and the stresses induced into the structure by wave action should be taken into account in the coupling design. A configuration for the ISO connectors on the SAMP unit is preferred in order to mechanically connect the bow and propulsion units to the SAMP unit such as shown in FIGS. 30 and 31. The same configuration can be on the bow and propulsion units in order to enable the mechanical connections. By having additional auxiliary ISO connectors on a special frame, the shear and tension caused by the weight on the topside as well as the stresses induced into the structure by wave action can be absorbed by the connectors, and allow the SAMP to be structurally rigid fore and aft. The auxiliary ISO connectors may be designed to be removed to greatly improve the utility of the individual units. The number of auxiliary ISO connectors used in the special frame can be adjustable depending on the shear and tension caused by the weight on the topside of the SAMP, as well as the stresses induced into the structure by wave action.

Figure 32:
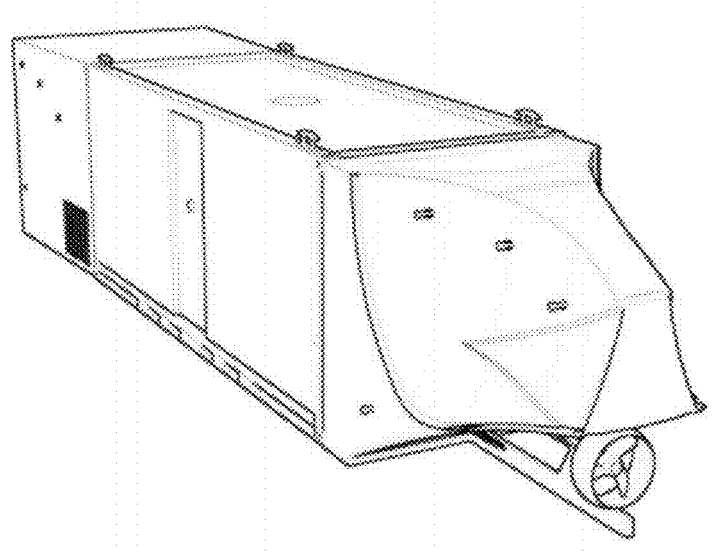
FIG. 32 illustrates aspects of an embodiment of the present invention depicting a SAMP propulsion unit engagement zone.

Referring to FIG. 32, the SAMP propulsion unit can be mechanically attached to the SAMP unit as described previously. In this embodiment, the outer housing of the SAMP propulsion unit is designed so that there is an engagement zone/region or saddle shaped in such a way as to form both an engagement zone and a wedged shape landing zone with the smaller dimension facing aft. This matches a complementary wedge shaped opening in the bow unit, or visa versa, with the larger dimension facing forward. These complementary design features allow for horizontal displacement of the engaging units of up to, for example, one-half their width. This greatly reduces the burden of accuracy on the command and control guidance systems of both units as well as steerage accuracy. Each SAMP is preferably symmetrical in order to allow attachments from either the propulsion unit end or the bow unit end. The SAMP propulsion unit houses, in this embodiment, a propulsion system (propulsor, propeller, KORT nozzle or azipod), an underwater exhaust system, an optional anti-roll gyroscope (ARG), and a grill over the air inlet on the topside in order to maintain a flat top-surface platform. The unit can be powered by any suitable power source, such as diesel or diesel hybrid engine, with accompanying fuel tanks and ancillary equipment as necessary. Pneumatic pads, deformable pads or hydraulic snubber pads are preferably employed and can be located on the SAMP propulsion unit engagement zone in order to lessen the impact forces upon engagement. The air-water boundary in the near-field zones supporting the engaging SAMP units tends to lessen the vertical displacement between the units and thus reduce the impact forces on coupling. The physical shapes of the engaging SAMP units allows water movement forces to assist in self alignment and sequential coupling of the locking bars if initially misaligned due to wave actions.

Figure 33:
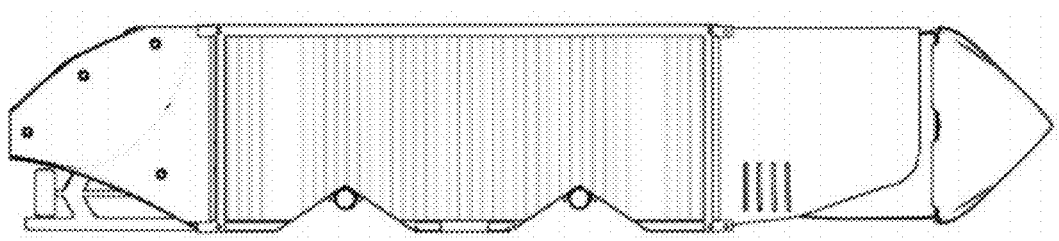
FIG. 33 illustrates aspects of an embodiment of the present invention depicting a SAMP bow unit including a pneumatic balloon.
Figure 34:
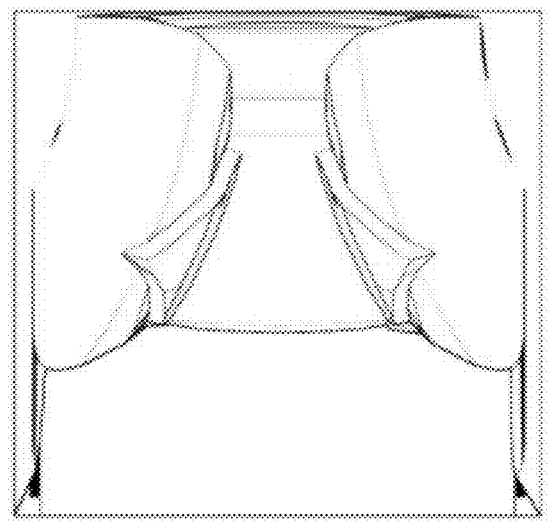
FIG. 34 illustrates aspects of an embodiment of the present invention depicting a SAMP bow unit having a wedged shape opening.

Referring to FIGS. 33-34, the bow unit has reduced buoyancy by including a flooded chamber or skeleton structure to reduce the influence on sea-keeping attributes of the SAMP unit. The complementary wedge shaped opening is streamlined with either a pneumatic balloon (where the bow is made of material such that when filled with 15-20 psi, it acts as a tensairity element) or a disposable plug made of bio-degradable plastic. Prior to coupling, the pneumatic balloon, as seen in FIG. 33, will be deflated, or the plug will be discarded, clearing the wedge shaped opening as seen in FIG. 34, and uncovering the locking bar receptacles integral with the bow unit. Pneumatic pads, deformable plastic pads or hydraulic snubber pads can be located on the bow unit in order to lessen the impact forces upon engagement.

Figure 35:
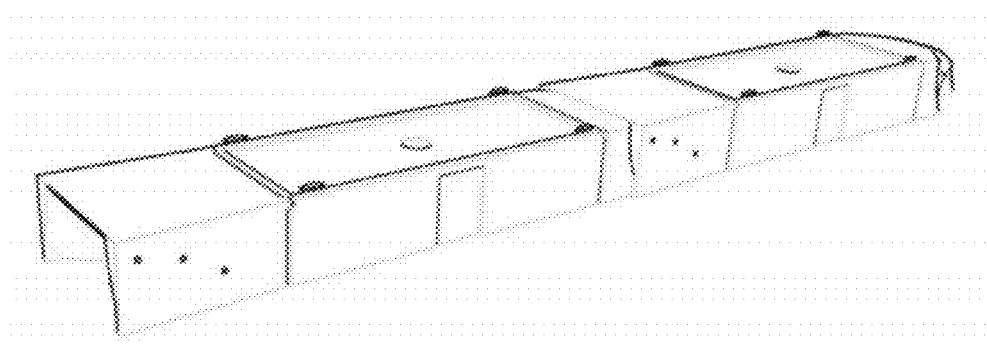
FIG. 35 illustrates aspects of an embodiment of the present invention depicting a SAMP with a nose to tail coupling.

Referring to FIG. 35, "Nose-to-tail" linear coupling of the SAMPs is preferred because closing speeds can be closely controlled, while maintaining safe steerage speeds of the two units. There are several scenarios possible for linear coupling.

In a first scenario, the forward SAMP is up on a wave, while the engaging SAMP is down in a trough. Upon engagement, the top locking bars of the engaging SAMP will engage prior to the aft and lower bars. As the crest/trough passes, the natural wave action from the next wave will serve to align the engaging SAMP to firmly seat into the engaging zone or saddle of the forward SAMP, thereby allowing the aft and lower bars to engage and lock. Standard proximity and contact sensors can be employed, as is known to those skilled in the art to initiate control of unit steering, speeds, and controlled actuation of locking apparatus via, for example, the propulsion unit control unit.

In another second scenario, the forward SAMP is down in a trough, while the engaging SAMP is up on a wave. In this scenario, upon engagement, the lower and aft bars will engage prior to the top locking bars. As the crest/trough passes, the natural wave action from the next wave will serve to align and seat the two SAMPs, thereby allowing the remaining upper bars to actuate and lock. As noted above, standard proximity and contact sensors can be employed in order to initiate control of unit steering, speeds, and controlled actuation of locking apparatus. During parallel coupling, "Nose-to-nose" coupling would typically require two versions of the SAMP units and require both units to become dead in the water in order to complete coupling, which is highly undesirable from a controllability and safety standpoint. "Nose-to-tail" coupling would allow for a single design to fulfill parallel coupling requirements, while maintaining safe steerage speeds.

Figure 36:
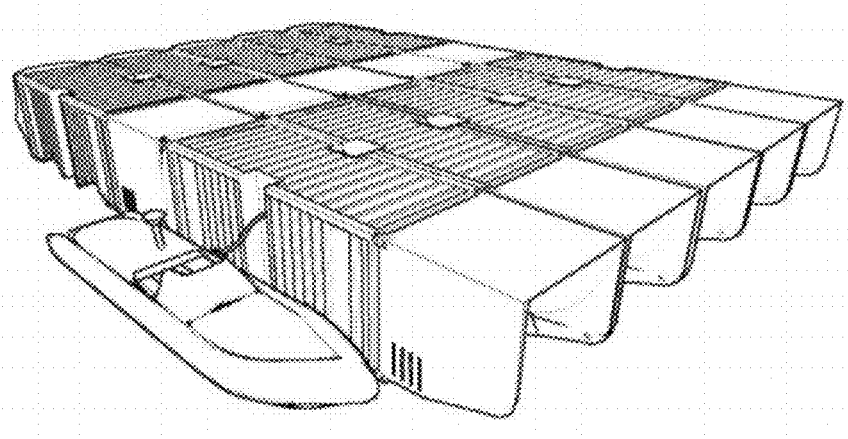
FIG. 36 illustrates aspects of an embodiment of the present invention depicting a SAMP refueling station.
Figure 37:
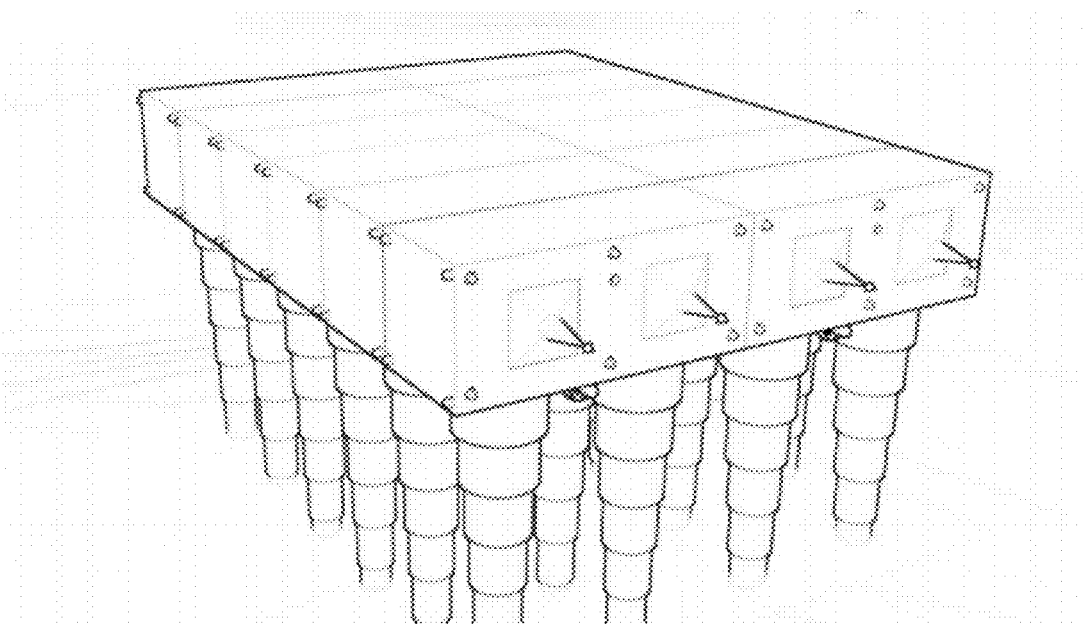
FIG. 37 illustrates aspects of an embodiment of the present invention depicting a robotic assembling pier ("RAP").

When connecting SAMPs in a parallel manner, the SAMP units will preferably have a retrieval apparatus near the bottom of the unit, such as approximately 2 feet up from the bottom of the unit. This would allow the SAMP units to align and close the distance to contact while self-aligning. Standard proximity and contact sensors can again, as noted above, be employed in order to initiate control of unit steering, speeds, and controlled actuation of retrieval and locking mechanisms. When the proximity sensors show that the two SAMP units are within capture distance range apart and within linear alignment range of each other, the retrieval probes are be deployed to engage the alignment wedge openings on the engaged unit allowing the mechanical interference to complete linear alignment and natural buoyancy to insert the retrieval probes into the retracting gears triggering their controlled actuation. The actuation can preferably be controlled by distance measuring sensors to ensure parallel engagement. When the parallel engagement is complete, both units will be physically aligned allowing the locking mechanisms (screws, clamps, t-bars) located at the outer perimeter of the retrieving unit to positively lock the units together. Such couplings could lead to applications such as a helicopter landing pad, small craft operations, as well as serve as refueling platforms as shown in FIG. 36.

Traditionally, mobile piers have been utilized to allow discharge of sea-going vessels at primitive beaches, but they are vulnerable to minimal sea states. Elevated piers require extensive machinery, manpower and time to install. The inventor recognized the need for a robotic system that could self-form a pier at sea, maneuver to the beach location, anchor itself and robotically elevate above the sea level. This rapid installation of a viable pier enables critical heavy weight supplies/rolling equipment to become readily available during humanitarian aid or disaster relief missions.

Figure 38:
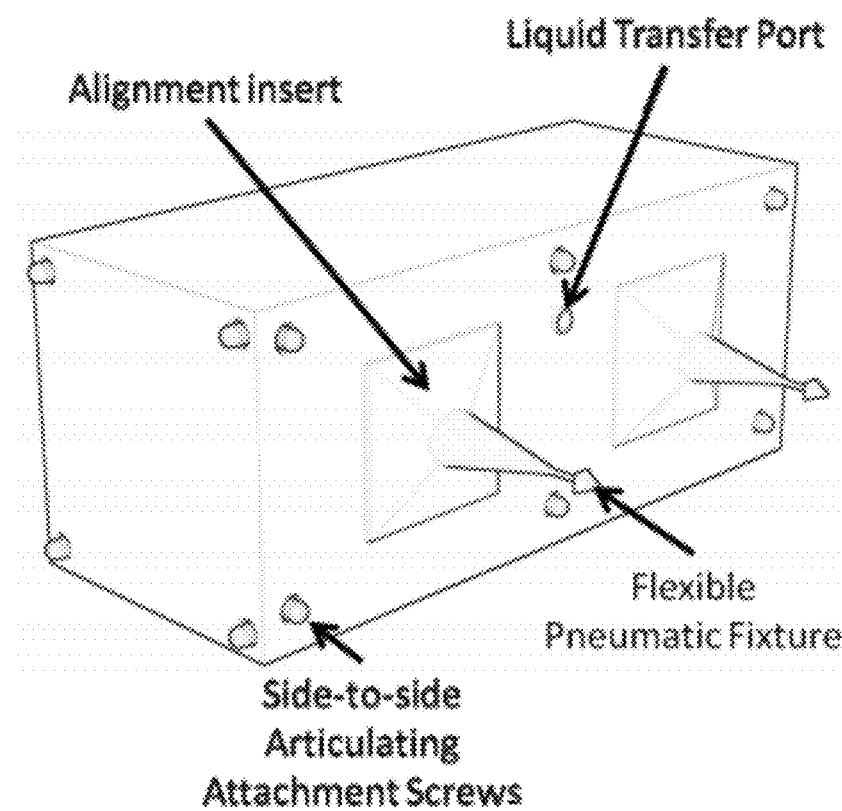
FIG. 38 illustrates aspects of an embodiment of the present invention depicting a single RAP unit with probes.

The Robotic Assembling Pier ("RAP") includes, in a preferred embodiment, an ISO container-sized module that includes a connection assembly to allow for multiple units to be positioned alongside one another so as to form a suitably sized pier for rolling stock delivery to a primitive beach. RAP units can also include an anchoring system to provide structural rigidity for the rolling stock to safely traverse the pier. Referring to FIG. 38, a preferred method of connection is an extending probe system. Two probes extend outward from one side of each RAP unit. The opposite side, shown in FIG. 38, of the RAP unit includes the fittings for the pneumatic fixtures and retractable lanyards (probes). The pneumatic fixtures are preferably flexible in nature with the retractable lanyard (probe) "barbs" retained by a cable-type retracting system.

Figure 39:
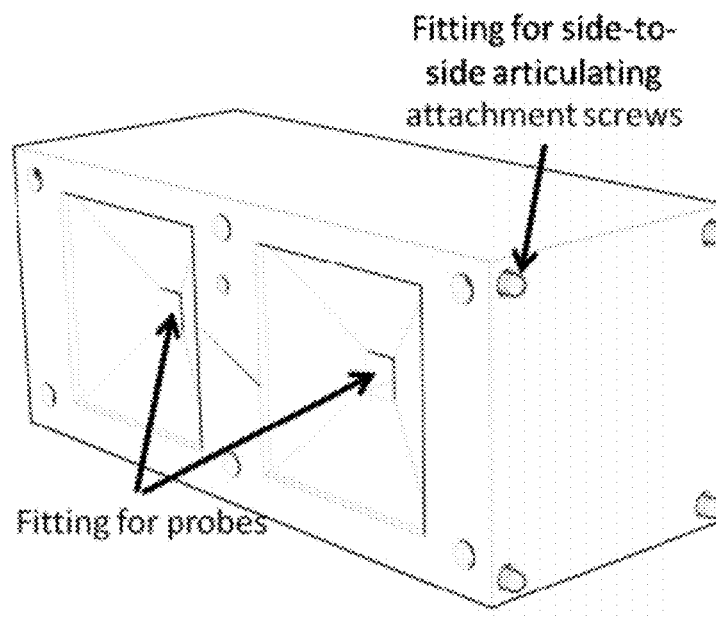
FIG. 39 illustrates aspects of an embodiment of the present invention depicting a single RAP unit including probe fittings.
Figure 40:
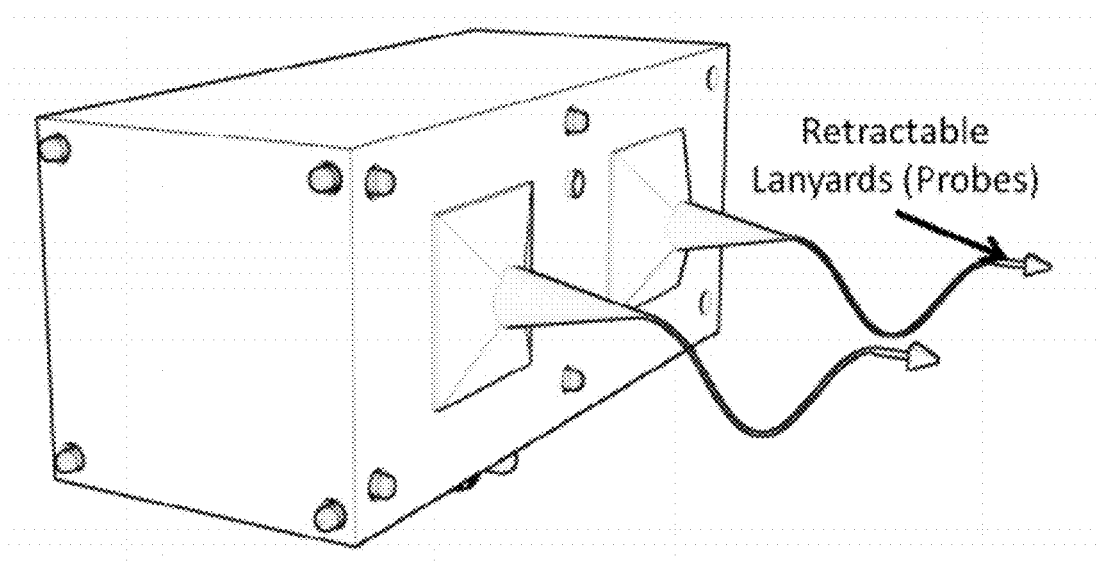
FIG. 40 illustrates aspects of an embodiment of the present invention depicting a single RAP unit including extended probes.

This arrangement allows the probes to remain flush with the outer surface plane of the ISO sized module when in storage, and allows ample deflection (without damage) when the ocean wave forces influence the coupling process. The fittings are designed in such a way that provides for a large lateral and vertical displacement tolerance during the connection process as seen in FIG. 39 and FIG. 40. In such an arrangement, the probe need only hit somewhere inside of the fitting and the shape of the fitting corrects the trajectory of the probe to coincide with the center. The probe is typically locked into place once fully inserted into the fitting. An common internal cable-type retraction system pulls both units together once both probes have been sensed to have been seated within the fittings and allows the shape of the recess to align both units.

A supplementary method of secure connection using the side-to-side screwjacks can be implemented once both units are aligned and in contact with each other. A suitable number of screwjacks (such as shown in FIG. 38), of an appropriate diameter, coincide with their respective fittings to assure a tight connection between the RAP units and to lessen the stress on the probes. The probe method of connection is most preferable for at-sea pier assembly, in which adverse sea states may hinder a straightforward connection effort, and a large tolerance for error is needed. If twenty foot container are used, the RAP will be deployed either in assembled or sub-assemblies (assembled onboard) or in sets of two, connected front-to-back; hence the front-to-back connection method consists of only screwjacks and no probes. Preferably, no front-to-back connections will take place at-sea with this embodiment of the RAP. Internal ballasting of each RAP unit would allow enhanced stabilization and roll by ballasting the unit down for side-to-side connections. Additionally, the ballasting can be used to enhance shallow water penetration as well as applying more force for telescoping caisson penetration into the seabed.

Figure 41:
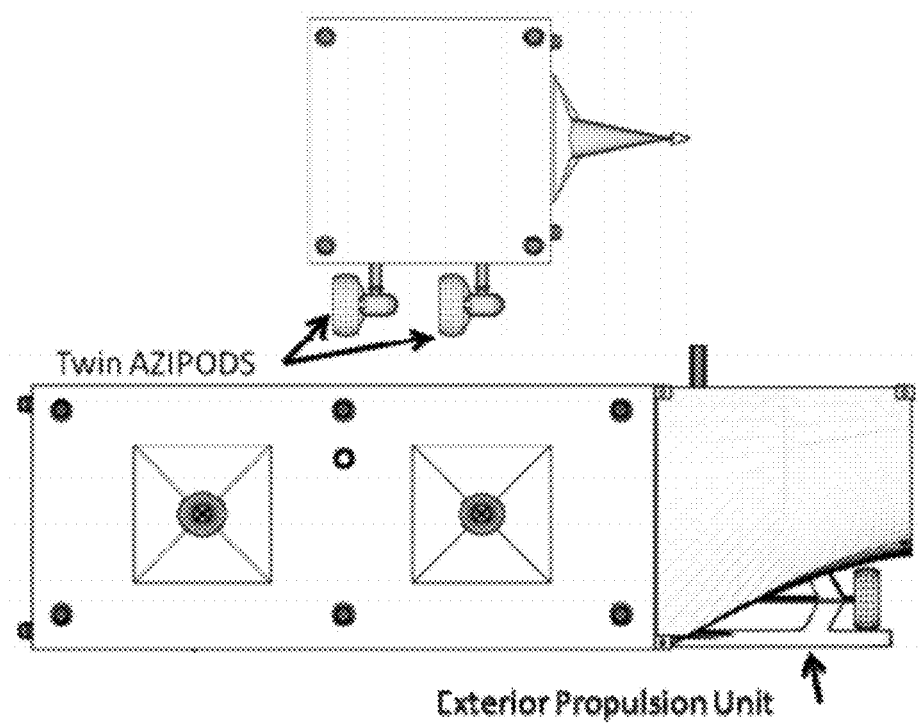
FIG. 41 illustrates aspects of an embodiment of the present invention depicting a bottom and side view of RAP unit including an attached propulsion unit.

The RAP units may utilize various propulsion methods. A primary method comprises hydraulically powered twin azipods, which will allow for precise maneuvering. The power source, a hydraulic pump, can be located inside the container-sized module with an engine, fuel supply (etc.) powering it. An optional exterior propulsion method can also be used. This method utilizes an ASCC propulsion unit, which includes power sources and communication devices inside of the propulsion unit as shown in FIG. 41.

Figure 42:
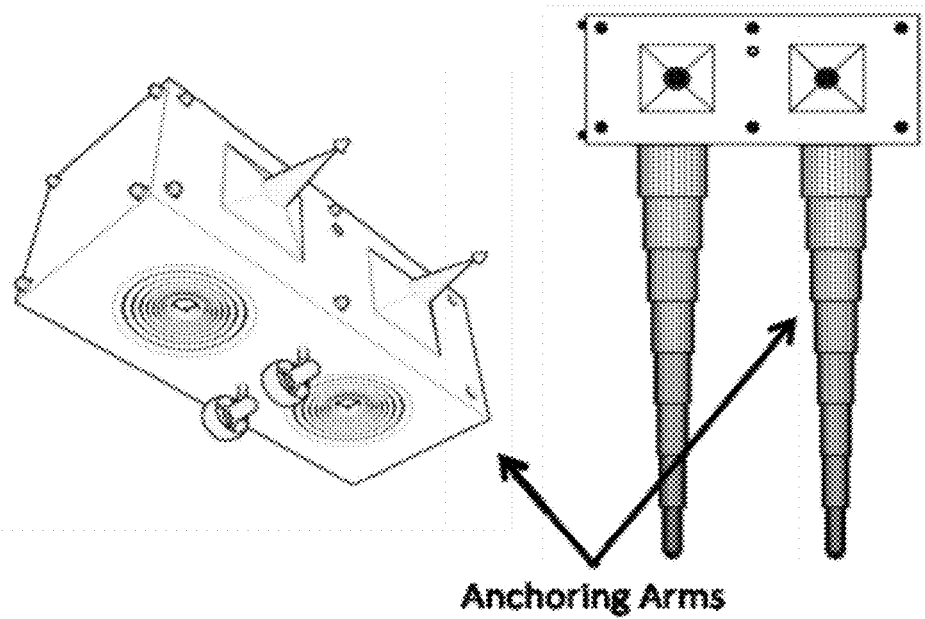
FIG. 42 illustrates aspects of an embodiment of the present invention depicting a RAP unit including an extended anchoring system.
Figure 43:
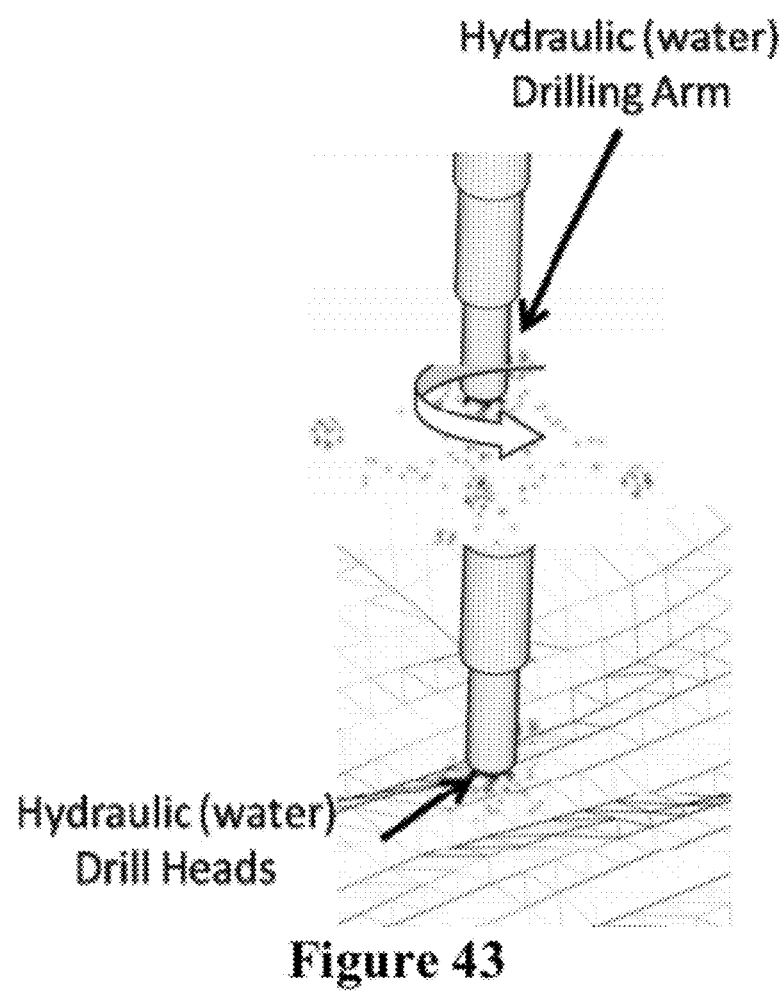
FIG. 43 illustrates aspects of an embodiment of the present invention depicting an anchoring system drilling process.

Referring to FIGS. 42 and 43, the RAP anchoring system involves a process of utilizing water pressure to extend concentric cylinders (telescoping caissons), referred to as the anchoring arms. After the front most RAP unit bottoms out and hits shallow water, a controller actuates the anchor process. A hydraulic pump, powered by the same engine that drives the twin azipods, powers pumps that push water from the surrounding environment into the anchoring arms. The innermost arms (the drilling arms, smallest diameter) are filled first. Once the pressure inside the arm reaches the threshold level, the arm is unlocked and starts to descend until it reaches the second locked position. At this point, internal valving controls the second innermost arm being filled in a similar fashion, allowing the descent of both itself and the drilling arm. This process continues until the drilling arms reach the sea floor. At this point, almost all water pressure is focused on rotating the drilling arm so as to penetrate the ground.

Once sensors detect that the drilling arm has hit ground (e.g., by sensing increased drive force), the water pump control valves funnel water into the drilling arm hoses. Increased water pressure in the drilling arm leads to rotation. The drilling head can include water nozzles which blow away pieces of rock and sand using the water pressure provided by the pump. The drilling head, coupled with the rotation of the drilling arm, allow the arm to bore down in the sea bed and anchor the RAP in place. During the drilling process, a small amount of water is still funneled to the other anchor arms to slowly continue their descent and aid the drilling arm in reaching further depths. After a drilling arm sensor detects no change in depth over a period of time (e.g., by sensing no change in the linear motion of the arm), indicating that the drilling arm has "jammed" out/hit bedrock, the pump shifts to driving the other anchor arms down. The pump stops after all anchor arms have been fully extended (e.g., as sensed by no further linear motion of the arms) and lock into position.

Once the drilling arms have anchored themselves at a suitable level below the sea floor or, as noted above, have "jammed" out/hit bedrock at a certain level, the process of filling each arms extension continues at a regular pace. As will be recognized by those skilled in the art, valves and sensors on the anchoring arms and in the container-sized modules ensure that the RAP stays level through the anchoring process. If additional mass is needed to further anchor the drilling arm, each RAP unit can be flooded. The entire ensemble is elevated out of the water by coordinated, controlled pumping into the remaining anchor arm sections until the desired elevation is reached or all arms are extended and locked. An access port at the top of each RAP unit allows hydraulic cement to be pumped into anchor arms after the RAP has installed in a manner such as described above. This allows for the creation of permanent pier at a primitive beach. Once the permanent pier is created, RAP units are preferably be stripped of all engines, pumps, and hydraulic motors.

An offshore petroleum discharge system ("OPDS") is a method that is currently implemented for the bulk transfer of petroleum from an offshore tanker to a beach termination unit ("BTU") that is located onshore. This process requires a huge investment in equipment, maintenance, manpower, and installation time. The inventor recognized a need for a robotic system to be sent from an offshore tanker and maneuver to the beach location while simultaneously creating an in-line pressure boosting system by deploying a "light weight" supply hose from the tanker to the shore. The simplified robotic deployment of the connection of supply hoses establishes an effective and faster fluid delivery system from sea to land that is scalable and tailorable to needs ashore from multiple locations.

Figure 44:
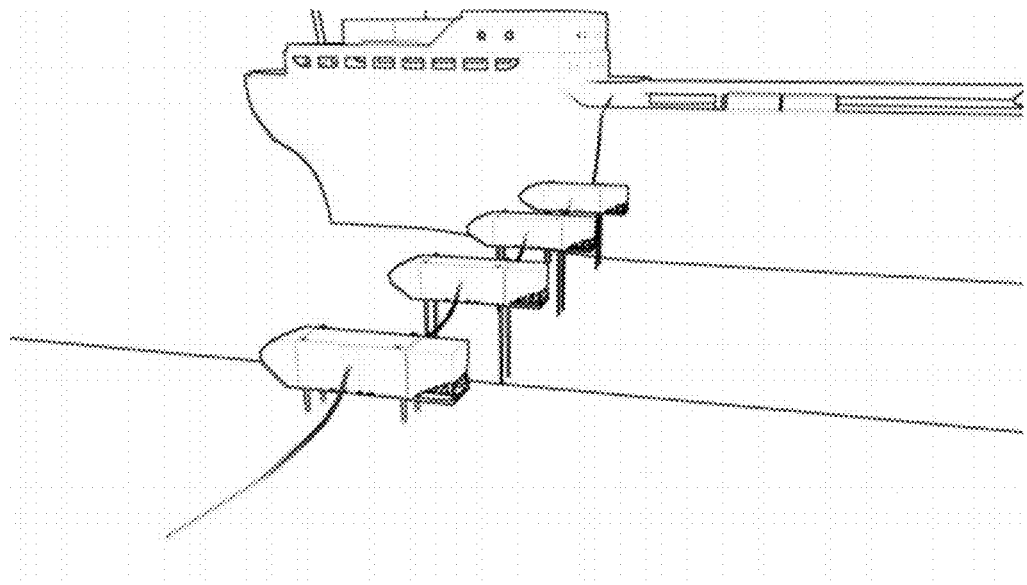
FIG. 44 illustrates aspects of an embodiment of the present invention depicting a deployable robotic fluid delivery system ("RFDS").

A preferred embodiment of a deployable robotic fluid delivery system ("RFDS") includes a system of unmanned surface vessels which autonomously navigate towards a targeted shore while self deploying the transfer supply hoses to form a fluid transfer system including a system of self-powered booster pumps from a tanker/supply ship to shore. The unmanned surface vessels can comprise ASCCs such as shown in FIG. 44. In a preferred embodiment, the ASCC modules include openings for the connection of quick disconnect non-drip supply hoses (e.g., an IN opening on one side with a corresponding OUT opening on the other side or the corresponding IN and OUT openings on the top). These openings can use two different arrangements of supply hose connections, such as the side arrangement or the top arrangement. The first configuration option is a longitudinal arrangement of RFDS units. This configuration would preferably use a fairlead at the front and back of the unit for the purpose of relieving the droop tension on the supply hose as it goes over the propulsion unit in the top arrangement of the connection of supply hoses. Such units would be equipped with a set of twin or single azipods.

A second configuration option is a lateral connection of the RFDS units. This configuration uses the side arrangement of the connection of supply hoses. These units can preferably be equipped with a set of twin or single azipods. The RFDS units can also adopt a third and fourth configurations which implement a dual powered twin or single azipods for the longitudinal and lateral configurations. In the dual power configuration, the pneumatic bow normally located at the front of the RFDS unit is swapped with another propulsion unit equipped with a set of twin or single azipods. This configuration increases the controllability of the RFDS units during anchoring and alignment of the RFDS units and use of the system.

A preferred deployment process of the RFDS comprises creating a succession of RFDS units connected with supply hoses from an offshore tanker to the shore. The first RFDS unit that is deployed only has a supply hose connected to it's IN opening. After being released into the water, the unit navigates towards the targeted shore. As the unit moves toward the shore, the supply hose will reach its length limitation. Once that happens, the first unit is commanded to stop and the other end of the supply hose is connected to OUT opening of the next RFDS unit. Another supply hose is connected to the IN opening of this RFDS unit before it is deployed into the water. After the deployment of the unit, both units are commanded to continue towards the shore. The formation of the RDFS units continues until the desired distance to the shore has been reached. In the case that the RFDS must get onto land, the initial RFDS units are equipped with a crawler attachment, such as discussed above, which enables them to climb up onto the shore.

After the deployment of the RFDS, the system has the ability to be in service for both the short and long term. If the RFDS is required only for short term use, the RFDS units are capable of maintaining position in the water through autonomous adjustments made by the azipods. However, if the ocean currents require excessive autonomous adjustments to hold position, anchors can be used. For example, two anchors can be located at the front and back of each RFDS unit that can be deployed to provide greater stability during use. These anchors can be connected to winches capable of deploying/retracting the anchors. Additionally, if the sea state induces excessive roll conditions, the RFDS unit can be flooded to increase stability. In a situation that requires the RFDS for long term use, each of the RFDS units can be equipped with hydraulic pressure legs, referred to as the anchoring arms (similar in design to those used in the RAP system but smaller in scale). The RFDS units first deploy the anchors in order to achieve greater initial stability. Next, the anchoring arms, powered by a sea water pump, push water from the surrounding environment into concentric cylinders that extend down until they reach the sea bottom. Once an anchoring arm reaches the sea bottom, it stops extending to prevent the units from tipping over due to the sloped sea floor approaching the shore. The anchoring arms then extend in a coordinated vertical fashion to maintain level attitude until the RFDS units have been lifted above the sea level to the desired point. Various sensors on the anchoring arms and in the ISO container sized modules ensure that the RFDS remain level. After the RFDS has been lifted, the anchoring arms lock into that position. The combination of the anchoring arms and the two anchors on each unit secure and stabilize the RFDS for long term use.

The interior components of the RFDS units comprise, for example, one or more fuel tanks, a pump engine, a control system, and a sea water pump. The fuel tanks include fuel used by the pump engine to power the in-line pressure boosting system and electrical generation. The control system, powered by the pump engine, commands the pump pressure, the on/off state of the RFDS units, controls deployment/retraction of the anchors; provide first line emergency response in the case of a spill or fire, and report the status of the fuel, engine health, and emergency type. The sea water pump powers the anchoring arms which were previously described as the long term stabilizers of the RFDS.

For the purposes of a fire fighting ASCC, the RFDS system can be utilized where the initial RFDS units are equipped with top OUT openings that are capable of spraying either water, aqueous film-forming foam ("AFFF"), or a biodegradable oil film dispersant and anchored to the bottom elevated out of the sea to provide a stable firefighting platform for shallow water structures ablaze. The firefighting nozzles can be remotely controlled or utilize a self-contained direction system described later.

In a preferred embodiment, the RFDS can serve as deployable solar energy harvesters by attaching solar panels to the top surfaces of the RFDS units. Instead of utilizing a hose which would transport liquids ashore, the module units of the RFDS units could be altered to provide electrical energy to the beach through the use of cables. These altered RFDS units could extend their anchoring arms, lifting them out of the water, to provide supplemental energy collected from wave actions through the use of a surface float suspended below the RFDS unit, having a connection link that would power internal electrical generators, adding to the energy harvested from the solar panels. An alternate embodiment of this concept could have a water purification/desalination system internal to the RFDS powered by the harvested energy. The connection to the beach would be a hose supplying fresh water.

For the purposes of serving as fire fighting ASCCs, the SAMP has several functions. One of its functions is to serve as a refueling station for small vessels or even the RFDS units. Instead of extra fuel, the SAMP can also hold oil film dispersant, aqueous film-forming foam ("AFFF"), or any other type of fire fighting/oil spill fighting liquid that is available to be utilized by fire fighting personnel. While, the SAMP has the ability to hold useful supplies inside its modules, it also serves as a platform to hold both supplies and personnel fighting the fire.

The SAMP also has the ability to be an energy harvester due to its ability to submerge into the water. Its ability to couple in multiple ways allows for its integration with existing technologies such as the AquaBuoy, the Oyster wave energy collection device, the Pelamis, and many more. Through use of any energy storage system, energy will be collected by wave energy collection devices. Once its energy storage capacity is filled, the SAMP then has the ability to autonomously resurface and transport the stored energy to more than one location due to the SAMP's ability to uncouple.

For the purposes of serving as fire fighting ASCCs, the RAP is useful when the sea states are too severe for the operation of the first and second configuration of the robotic fluid delivery system ("RFDS") or the SAMP fire fighting ASCC. The ability to robotically form a secure pier close to the oil platform (depending on the depth of the water) allows for supplies to be brought in from boats to combat the fires. Additionally, boats that have fire fighting capabilities are able to dock to help fight the fire. Besides serving as a pier for supplies and ships, the RAP can also be a safety zone for people to fight the fire in case the oil platform becomes too volatile or begins to sink. Furthermore, since the RAP has the ability to easily relocate, the pier has the ability to relocate itself so that it can be, for example, upwind of the fire.

The RAP also has the ability to serve as an energy harvester due to its ability to lift up out of the water via extension of anchoring arms to create a large, structurally sound surface. Solar panels can be attached to the top surfaces of the RAP so that it serves as a solar energy harvester. The solar energy from the solar panels can be stored in a energy storage device. Once the energy storage capacity of the RAP is filled, the RAP can be lowered, e.g., lowers itself, back into the water and has the option of either disconnecting into separate RAP units or remaining a single unit to transport the harvested energy. Since the RAP can disconnect into RAP units, this allows for the energy to be transported to multiple desired locations. In addition to collecting solar energy, the RAP is capable of providing a stable flat surface to support a wind turbine. Similar to the solar energy, the wind energy will be collected with an energy storage device. An optional energy storage device would be powering a generator(s) that are placed on top of the RAP. This allows for the RAP to become a permanent structure to collect wind energy.

Figure 47:
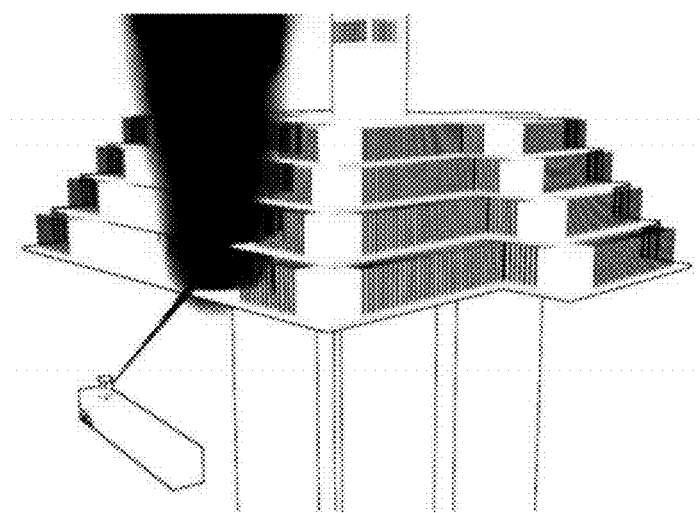
FIG. 47 illustrates aspects of an embodiment of the present invention depicting a firefighting ASCC.
Figure 48:
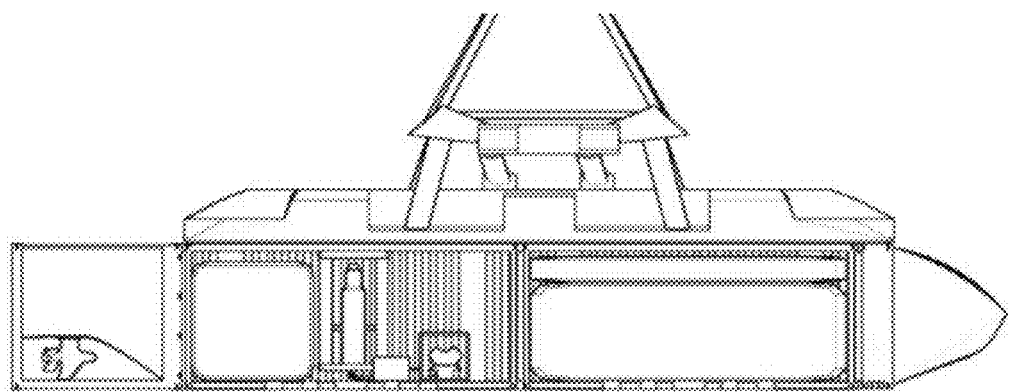
FIG. 48 illustrates aspects of an embodiment of the present invention depicting a firefighting ASCC internal structure and platform deployment system.

Current technologies are not efficient enough in handling at-sea fires from oil platform explosions to prevent the platforms from sinking and causing a large scale disaster. The inventor recognized the need for a robotic system to maneuver to and eliminate an at-sea fire. The ability to quickly and efficiently put out at-sea fires while reducing personnel risk will prove to be vital in future catastrophes. A fire fighting ASCC is a system of unmanned surface vessels which autonomously navigate towards a targeted oil platform fire to help to effectively put out the fire. The unmanned surface vessels comprise ASCCs. The firefighting specialized ISO-sized container of the ASCC preferably includes a gyro-stabilizer, sensor as well as retractable nozzle that allows for specific targeting of hotspots during a fire. An alternate design can have a firefighting nozzle could be built into the propulsion unit, and utilized the propulsion engine as a power source for the pump as seen in FIG. 47 and FIG. 48.

Recent oil spills have magnified the inability of current oil contamination cleanup methods to effectively collect massive oil spills in the open sea. Current methods such as oil skimming vessels require large logistical operations in order to deploy while putting personnel at risk from collisions, flames, toxins, and other hazardous materials. As limited as the capabilities are to remove surface spills on the ocean, the capability to remove oil plumes beneath the surface are almost non-existent. Also, these large logistical operations demand an immense amount of money and manpower resulting in a delayed reaction. Additionally, present methods are highly dependent on weather conditions and acceptable sea state conditions, as well as risk from fire and fumes.

Figure 48A:
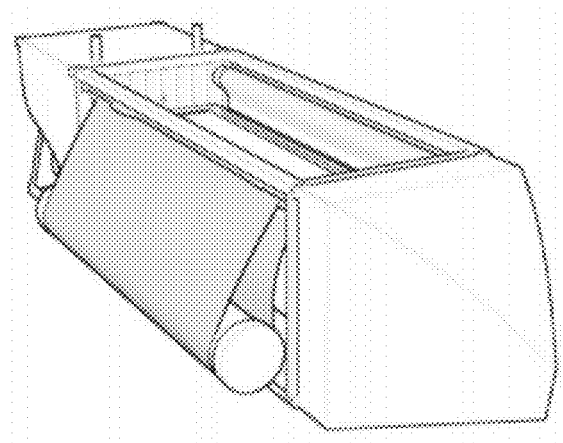
FIG. 48A illustrates aspects of an embodiment of the present invention depicting an oil collection ASCC.

FIG. 48A illustrates aspects of an embodiment of the present invention depicting an oil collection ASCC. An oil collection ASCC is an unmanned surface vessel that can autonomously navigate to the contaminated zone and start cleanup efforts via, for example, a gravity separation process. The process allows for the containment of the oil and release of clean water back into the environment. The oil collection ASCC can use a custom container-sized container rather than a standard sized container. Preferably the container includes a spool and scraper system that funnels the contaminated mixture into a collapsible containment system. Stability and buoyancy of the oil collection ASCC can be provided by the lightweight large rotating powered spools.

Figure 49:
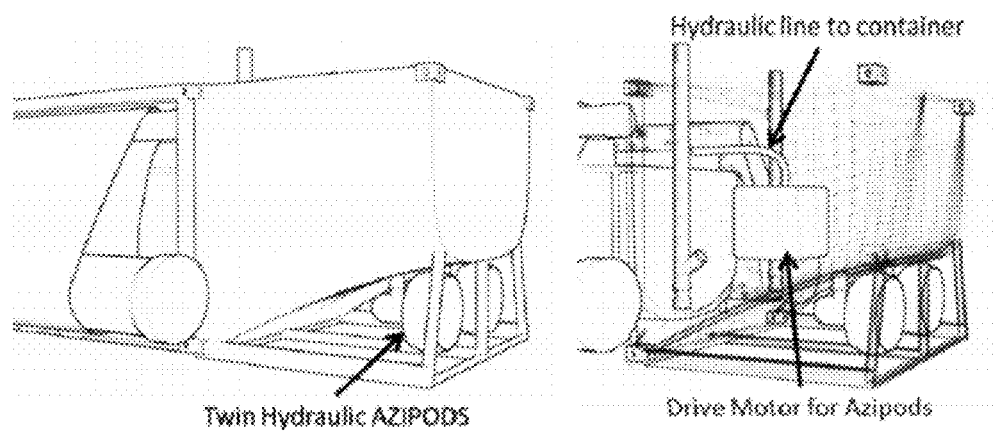
FIG. 49 illustrates aspects of an embodiment of the present invention depicting a propulsion unit.

Referring to FIG. 49, the oil collection ASCC can preferably utilize hydraulically driven twin azipods in its propulsion unit to traverse through the water. A pneumatic bow unit, may or may not be needed for navigating towards the contaminated zone. The azipods can be powered by a hydraulic motor, such as illustrated in FIG. 49, included within the propulsion unit. The hydraulic motor can also feed a line penetrating the back of the container sized module and into a controller for the spools. An alternate design utilizes an electric motor in place of the hydraulic motor to power the spools.

Figure 50:
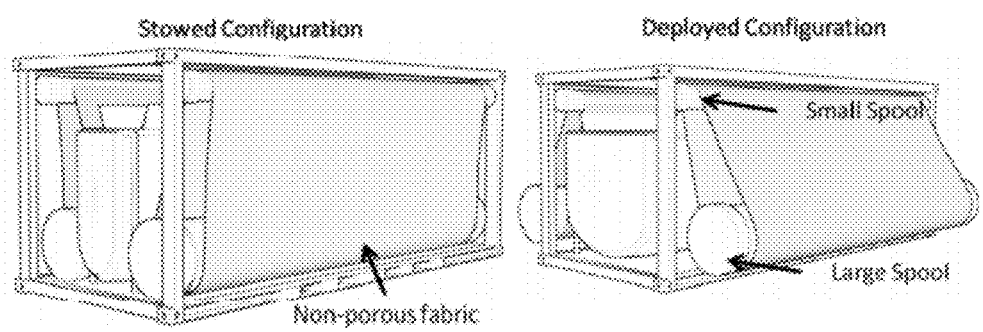
FIG. 50 illustrates aspects of an embodiment of the present invention depicting stowed and deployed spool configurations.

Referring to FIG. 50, a hydraulic controller, in accordance with known techniques, preferably actuates the extension and retraction of the spool systems to convert to the deployed configuration from the stowed configuration and vice versa. The controller can also, in accordance with known techniques, determine the speeds of the small spools, which in turn drives the rotation of the spool system as well as the non-porous fabric, such as lipophilic fabric. As the fabric rotates about the spools, it collects the multi-component contaminated mixture of oil and water on its surface. The oil's viscosity allows for it to stick to the fabric and travel along the path to the scraper/roller. The particular controller and/or sensors used are dependent upon the application and are within the knowledge of one skilled in the art.

Figure 51:
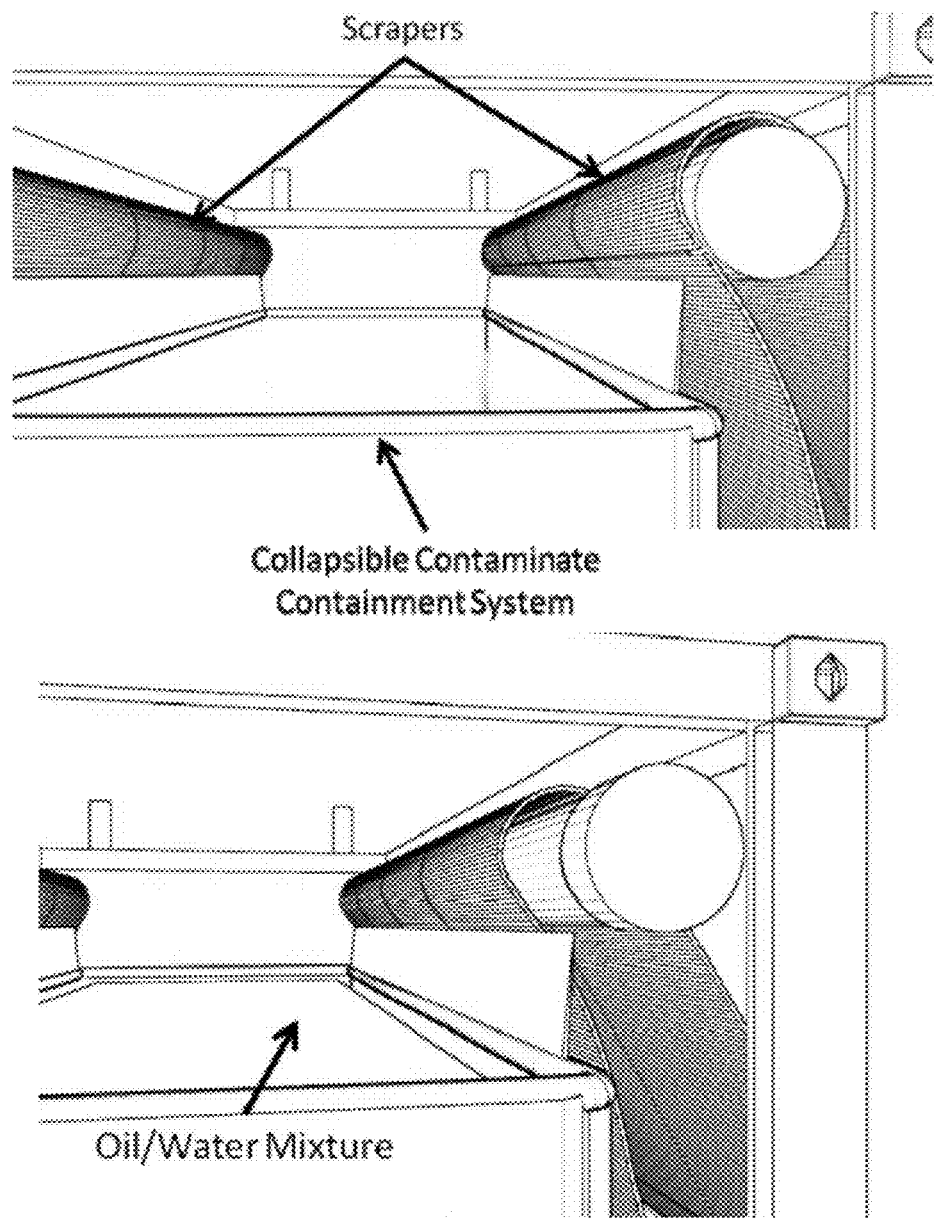
FIG. 51 illustrates aspects of an embodiment of the present invention depicting a scraper and containment system.

Referring to FIG. 51, two scrapers, preferably one along each side of the collapsible containment system, can comprise blades that extend the length of the fabric and scrape the oil/water mixture into the collapsible bag inside the container. The scrapers are preferably positioned and oriented in such a way that the oil/water mixture run down their sides into the collapsible bag and also so excess oil does not build up on the blade.

Figure 52:
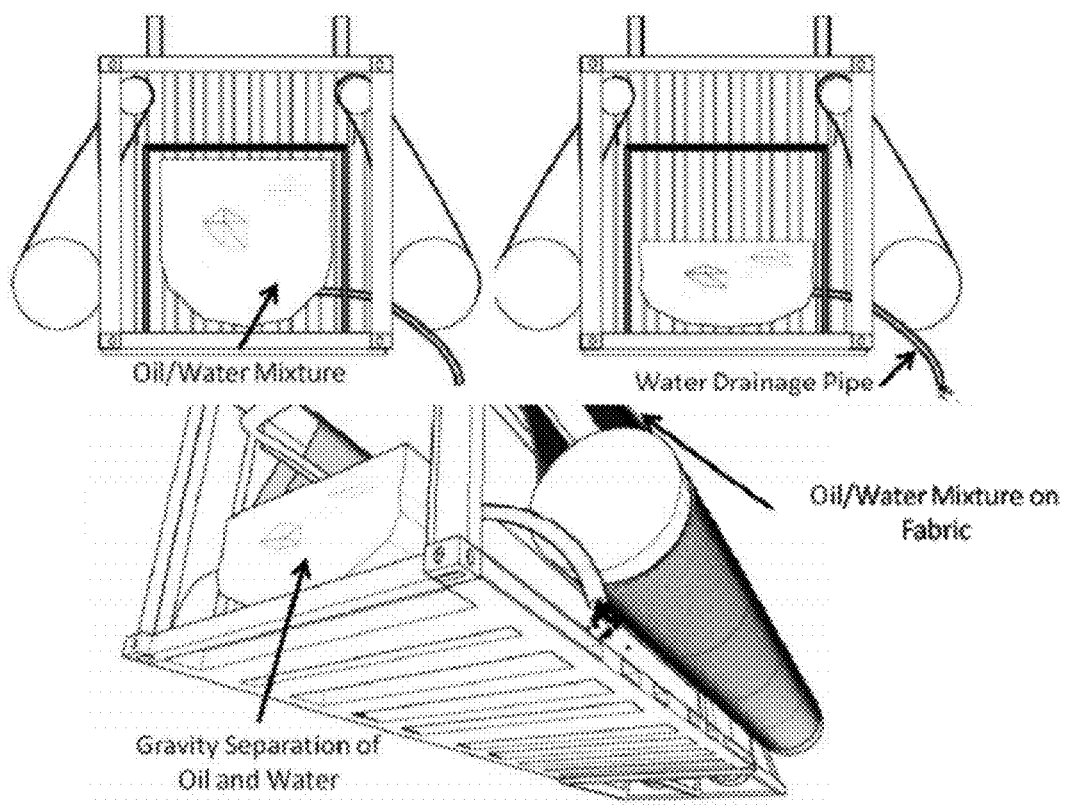
FIG. 52 illustrates aspects of an embodiment of the present invention depicting a drainage system.
Figure 53:
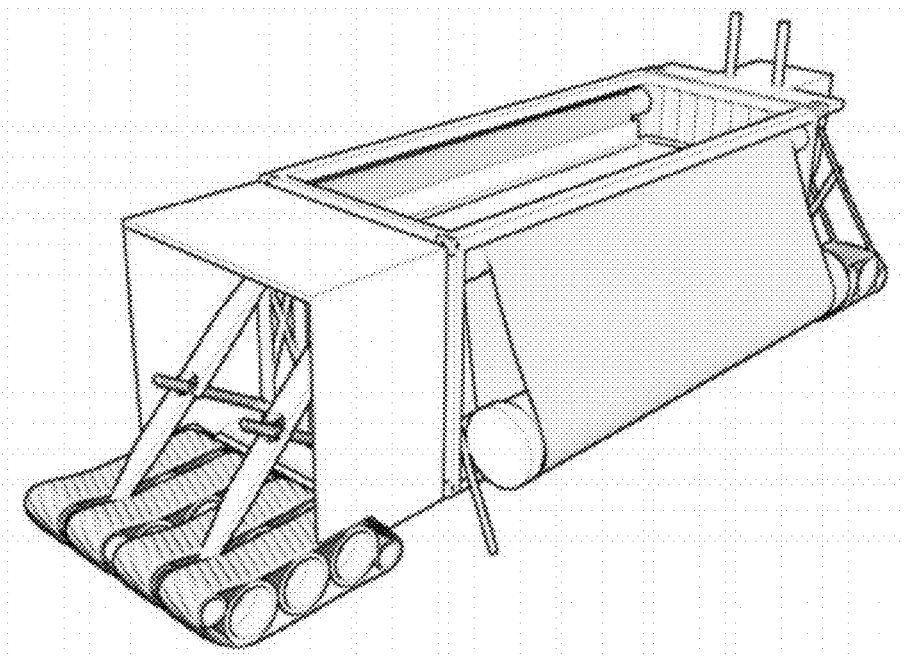
FIG. 53 illustrates aspects of an embodiment of the present invention depicting an oil collection ASCC including a crawler attachment.

Referring to FIG. 52, once the oil/water mixture is inside the containment system, natural gravity separation allows for the common distinct division between water and oil. Sensors are preferably positioned at various levels in the collapsible contaminate containment system allow for the detection of oil. A check valve and pump at the bottom of the containment system lead to the water drainage pipe as shown in FIG. 52. When the sensors detect only the presence of water, the pump is activated and clean water is pumped back into the water environment. Alternatively, the pumps remain activated until the presence of oil is sensed, and they are deactivated to prevent oil to be pumped back into the water environment.

In a preferred embodiment of the present invention an oil collection ASCC can maintain a GPS location or a designated pattern while the fabric collects oil from contaminated body of water. Once the containment bag is full of oil, the oil collection ASCC will stop collection, maintain its position, head to a designated area for offload, or await further command from.

An ASCC oil collection system can effectively collect oil contaminations in the open sea while taking away the constraints of manpower requirements, personnel risk, and the huge expense of manned logistical operations. By eliminating these constraints and allowing affordable prepositioning and rapid response time, environmental damage and the cleanup costs can be reduced. An optional configuration for an oil collection ASCC can also include an amphibious crawler attachment, which is discussed above. The crawler attachment enables the oil collection ASCCs to navigate onto the shore after finishing collecting oil to allow for easy emptying.

The oil collection ASCC is able to maintain a GPS location or holding pattern while the sheet collects oil from a contaminated body of water. Once the containment bag is full of oil, the hydraulic controller may retract the spool system or maintain deployment of the spool system and the Oil Collection ASCC will maintain its position, head to a designated area, or await further command(s).

Figure 54:
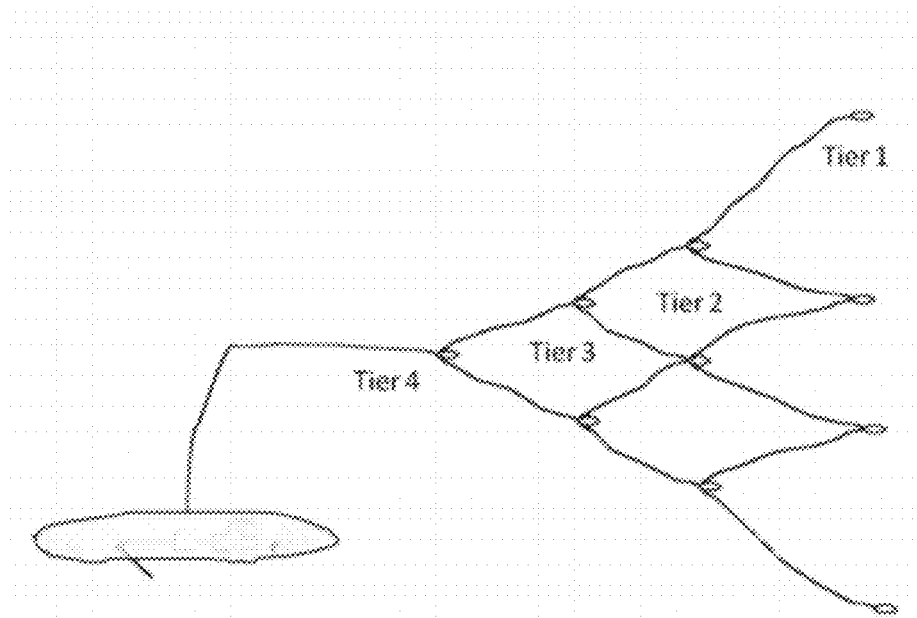
FIG. 54 illustrates aspects of an embodiment of the present invention depicting a hydra skimmer.

Referring top FIG. 54, an ASCC hydra skimmer includes a system of unmanned surface vessels which autonomously navigate through open sea towards an area of oil contamination. The ASCC Hydra Skimmer comprises oil collection ASCCs connected in a dynamic array allowing collection on a wide sweep as well as the staged concentration of pollutants vs. ocean water through gravity separation by each succeeding tier. These ASCCs are preferably configured with dual discharge booms to concentrate surface oil for the following ASCC in the array. The booms also serve as transfer lines for the oil/water mixture collected by preceding ASCC hydra skimmers.

The ASCC hydra skimmer system can comprise interconnected oil collection ASCCs which form an autonomous mobile oil collection system. The autonomy of the hydra skimmer array gives it the ability to navigate in a coordinated way to sweep a wide area of the contamination sites. Contamination sites can be identified from data received from surface vessels, UAVs, manned aircrafts, satellite surveillance, etc. The total size and expansion of the array formation will depend on the operation requirements (viscosity of crude oil, size of contamination, etc). The number of tiers used will increase the concentration of the recovered oil based upon the number of gravity separations that occur in the array. The collected oil to water ratio in the containers increases in every tier. FIG. 52 depicts tiers of oil concentration occurring within the container (by gravity separation), and in FIG. 54, on the ocean surface by the configuration of the booms (by funneling) to concentrate the oil for contact with the rollers. As the concentrated oil/water mixture is pumped to the next succeeding ASCC hydra skimmer in the following tier, it is mixed with the oil/water skimmed from the surface by the pick-up rollers to be further concentrated. In the first stage, the transfer booms concentrate the surface contaminants for the second stage. The v-shaped patterns formed by interior transfer booms serve to concentrate the missed contaminants.

In the illustrated embodiment, the ASCC hydra skimmer units are linked together with floating hoses which serve dual purposes of being contaminant transfer lines and surface booms. The floating hoses can, in an embodiment of the present invention, include two chambers; the inner chamber for the transfer of contaminants to succeeding oil collection trucks in the follow-on tiers for further gravity separation, and the outer chamber, a pneumatic bladder to enable the hoses to float. As the ASCC hydra skimmer navigates through the contamination, the floating hoses act as booms by "channeling" the oil into a concentrated area to be picked up by the rolling belts of the next ASCC hydra skimmer. The various movement settings of the leading ASCC Hydra Skimmer units enable the maximum collection of oil in the area between the booms from the coordinated movements of the entire array of ASCC hydra units. The direction of travel of the array can be coordinated to optimize the recovery with a collection vessel (tanker or barge) trailing behind the last ASCC hydra skimmer in the array. The ASCC hydra skimmer preferably also has the ability to collect oil around, for example, ships, islands, obstructions by skimming around the periphery of the obstacle for a clean sweep of the ocean. Since each of the oil collecting ASCCs has a GPS system and a maintained two-way communication, coordinated movements of the array can be determined by a number of known commanding control methodologies.

Figure 45:
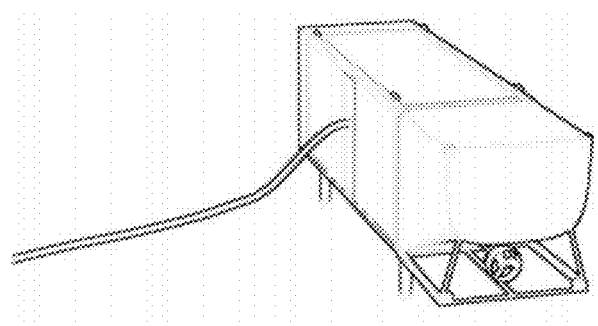
FIG. 45 illustrates aspects of an embodiment of the present invention depicting a single RFDS unit.
Figure 46:
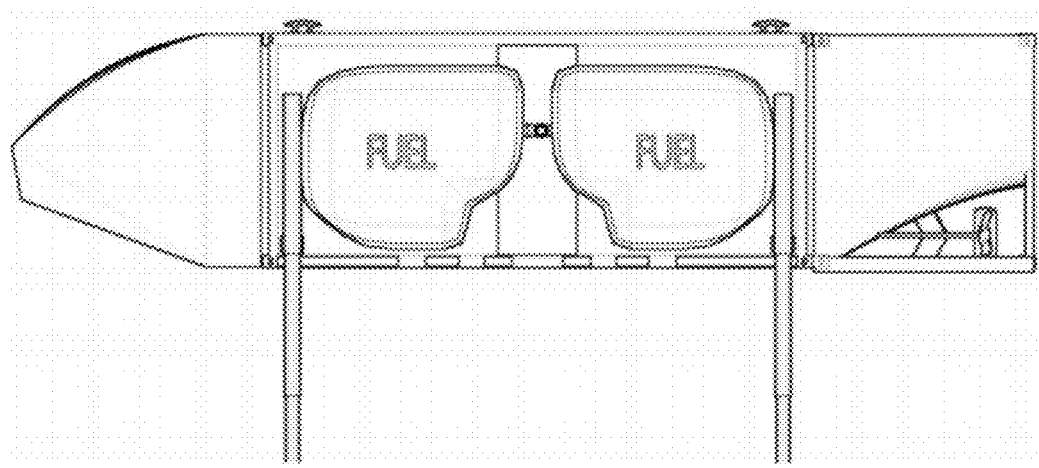
FIG. 46 illustrates aspects of an embodiment of the present invention depicting a RFDS internal structure.
Figure 56:
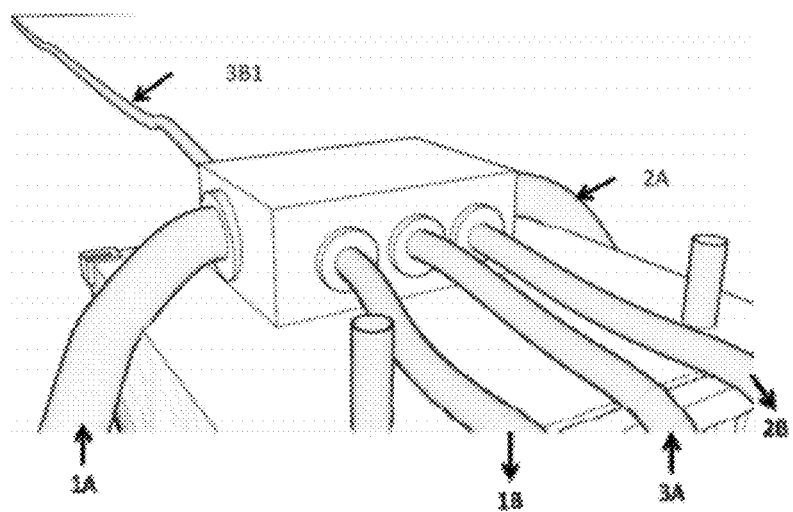
FIG. 56 illustrates aspects of an embodiment of the present invention depicting a mountable transfer pump, wherein arrows indicate inlet/outlet.

The ASCC hydra skimmer units can include a mountable transfer pump such as schematically illustrated in FIG. 56. In an embodiment of the present invention, the transfer pump can be powered by the basic ASCC power system to allow for the oil/water mixture transfer through the boom transfer lines. An ASCC hydra skimmer unit, such as illustrated in FIG. 45, can include an attachment equipped with a discharge pump to transfer the suctioned contaminants from the container downstream to the next ASCC hydra skimmer unit or tanker. Depending upon the application, the discharge pump can be controlled remotely or autonomously pumps when crude oil is sensed. The pumped oil/water mixture transfers to the succeeding ASCC hydra skimmer unit for further gravity processing. The attachment can be a mountable attachment and be mountable to the top of the ASCC propulsion unit and permits the ASCC hydra skimmer array to be readily formed from individual ASCC oil collection/hydra skimmer units, and hence scaled to meet the needs of the situation. In one exemplary embodiment illustrated in FIG. 56, there are seven total inlets/outlets on the attachment. The inlets (1A & 2A) receive oil/water mixture pumped from preceding ASCC hydra units. Their corresponding outlets (1B & 2B) pump the mixture into the container for further gravity separation of the contaminants and the sea water. The inlet (3A) is connected to a suction hose which transfers the separated contaminants to the next ASCC hydra unit through the outlets (3B1 & 3B2). The outer ASCC hydra units in the array will only utilize one of the outlets (either 3B1 or 3B2). The leading ASCC hydra unit will not utilize the inlets (1A & 2A) as well as their corresponding outlets (1B & 2B). The outlets that are not utilized can be closed. This mountable transfer pump may also be utilized by single oil collection ASCC hydra units that are not intended to return to a cargo ship to allow for ready emptying.

Figure 55:
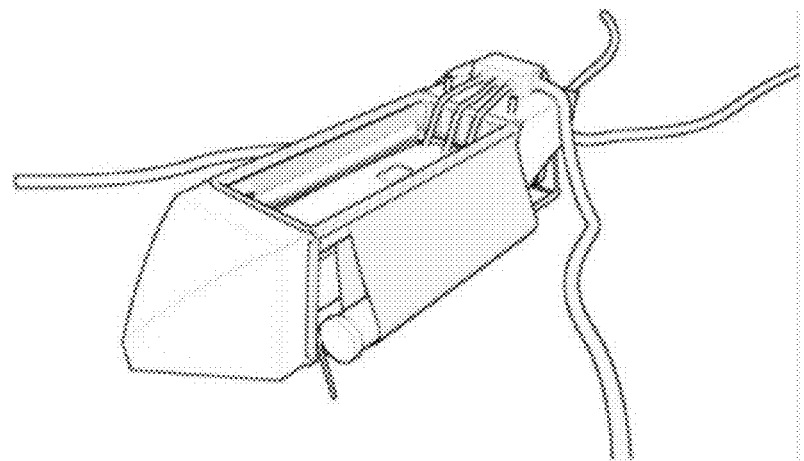
FIG. 55 illustrates aspects of an embodiment of the present invention depicting a hydra skimmer unit.
Figure 57:
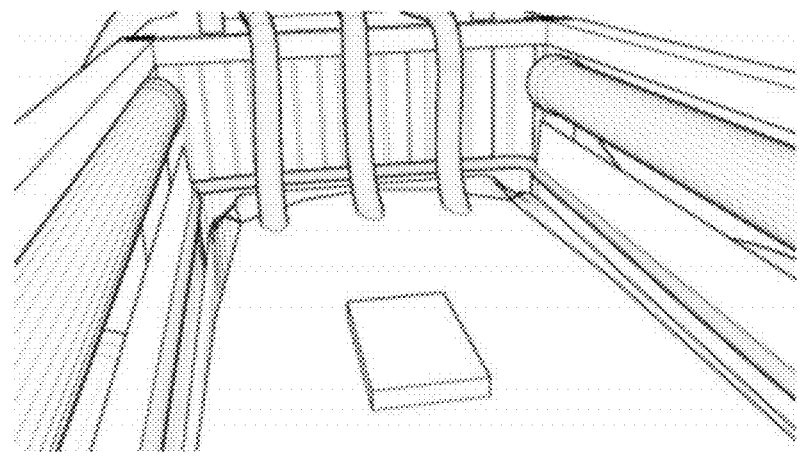
FIG. 57 illustrates aspects of an embodiment of the present invention depicting a collection float in container.

As noted above, in a preferred embodiment of an ASCC hydra skimmer such as illustrated in FIG. 54, once the oil-water mixture is collected into the containers of the individual ASCC hydra skimmer units, such as shown in FIG. 55, it can be pumped back to the next ASCC hydra skimmer unit. This process continues until the mixture is pumped to the tanker, barge, collection bag, or other collection point. In order to maximize the percentage of oil in the mixture transferred through the hoses, the suction hose in each container can utilize a collection float such as shown in FIG. 57. Preferably, a collection float allows the suction hose to stay immersed in the crude oil layer within the container. This is made possible because the collection float's specific gravity is preferably selected to be between that of water and crude oil. While this design does not fully guarantee that only oil will be transferred, this repeated process of the retrieval of contaminants through the multiple tiers of the ASCC hydra skimmer significantly increases the percentage of crude oil in the mixture that is transferred to the tanker.

Figure 58:
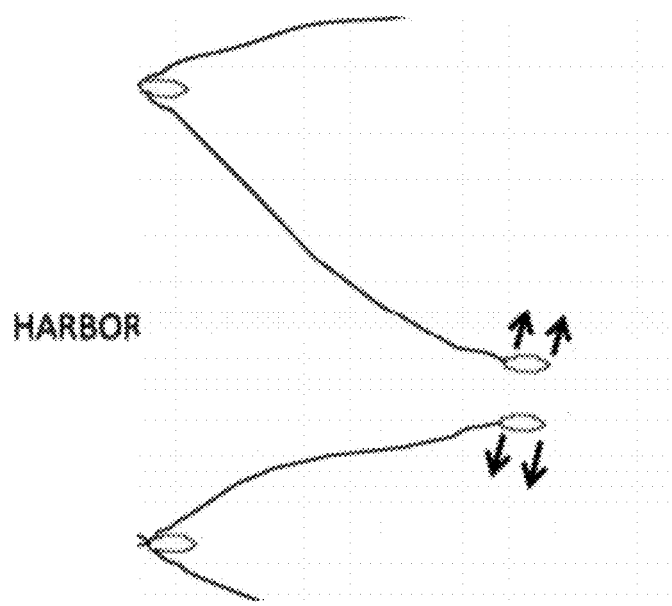
FIG. 58 illustrates aspects of an embodiment of the present invention depicting a controllable "Gate."

As illustrated in FIG. 58, in addition to cleaning up oil contamination in the open sea, and exemplary embodiment of the ASCC hydra skimmer can also serve as an active and adaptive boom barrier to protect vital coastline and sea channels. Due to its flexible nature of being able to be deployed from both a coast line and a container ship coupled with its highly variable and scalable formation size, the ASCC hydra skimmer has the ability to protect significant critical coast line areas and habitats while using natural wind and tidal motion to bring the contamination to the ASCC Hydra Skimmer array and pump it to an onshore center. If long term protection of the coastline is required, a modified configuration of the ASCC hydra skimmer units can be equipped with remote controlled anchors which are deployed from the bow to maintain position for lengthy periods of time. Additionally, the transfer lines/booms can include electrical power lines to power the electrical powered version of the ASCC hydra skimmer units from a power station ashore—almost indefinitely. This eliminates the need to disrupt the array during a refueling of the ASCC hydra skimmer units. The movement of the array and the initial positioning may be powered with any suitable drive mechanism, including a diesel or electrical engine. The ASCC Hydra skimmer can serve as an active or static barrier protection for coastline and wetlands without requiring federal licensing that are required for constructing permanent barrier reefs that merely shield the coastline without collecting the contaminants.

Figure 59:
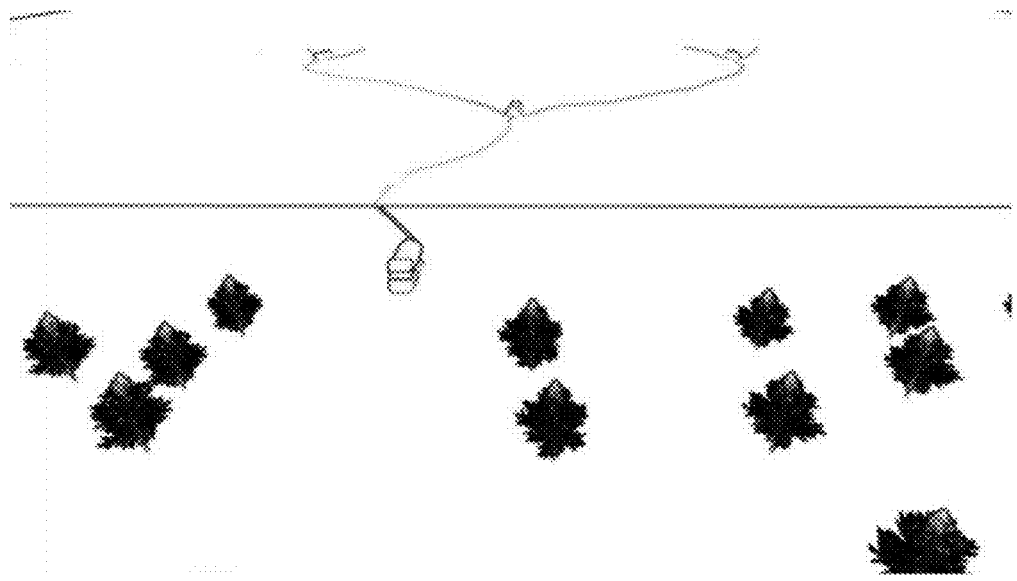
FIG. 59 illustrates aspects of an embodiment of the present invention depicting wetlands protection system.

Embodiments of the ASCC hydra skimmer can also provide an effective method to protect sea channels and harbors whereas current methods significantly disrupt the traffic in the channels and ports. Referring to FIG. 58 and FIG. 59, this is possible through the deployment of, for example, two formations of ASCC hydra skimmers on either side of the channel so that a controllable "gate" of the adjacent ends of the ASCC hydra skimmers can "open and close" to allow vessels in and out of the channel while maintaining protection. Through this same action, the ASCC hydra skimmer can also serve to contain a contamination within a harbor and not allow for it to spread into the open sea while still allowing the in-and-out trafficking of vessels.

Figure 60:
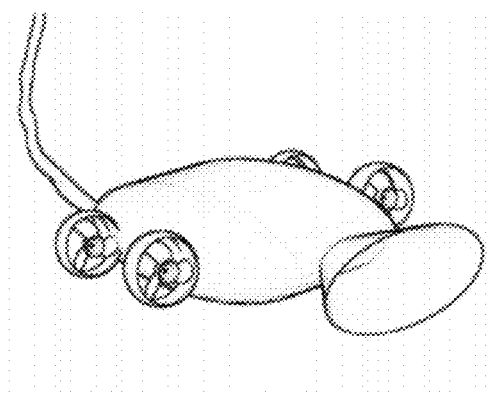
FIG. 60 illustrates aspects of an embodiment of the present invention depicting an underwater oil plume collector system.
Figure 61:
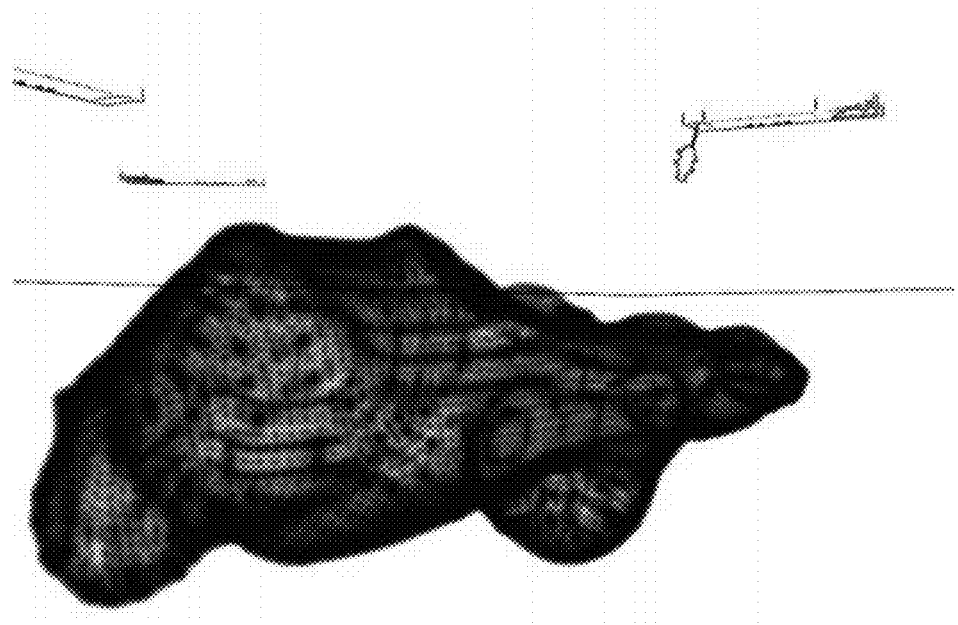
FIG. 61 illustrates aspects of an embodiment of the present invention depicting an underwater oil plume collector system being deployed from ASCC.
Figure 62:
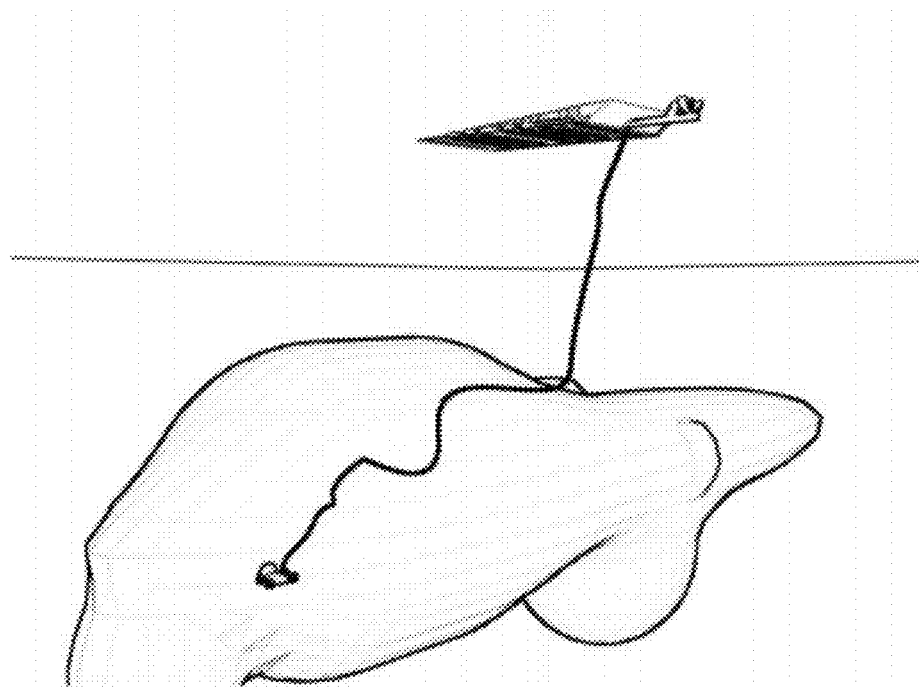
FIG. 62 illustrates aspects of an embodiment of the present invention depicting a deployed ROOR-BOT and ASCC.
Figure 63:
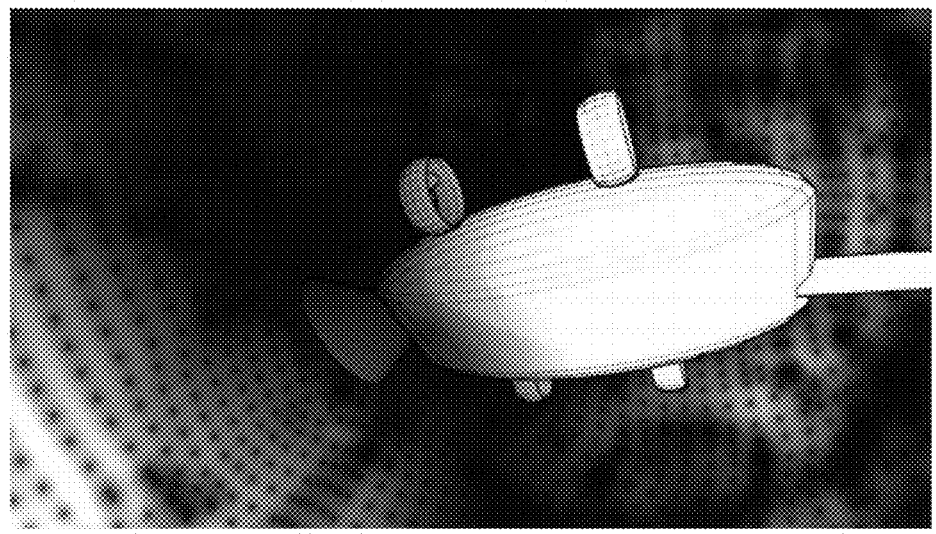
FIG. 63 illustrates aspects of an embodiment of the present invention depicting a deployed ROOR-BOT beginning collection of underwater oil plume.

Although ASCC hydra skimmer units clean up surface contamination such as oil, there may be significant oil plumes under the water beyond the reach of surface technologies. FIG. 60, illustrates an exemplary embodiment of a robotic offboard oil recovery bot ("ROOR-BOT"). In a preferred embodiment, an ASCC unit that collaborates with the ROOR-BOT can use the ASCC structure with a customized commercial container. In on embodiment, the customized container can be an open top collection cargo container equipped with an open top collection bladder. In a preferred embodiment, the ASCC includes an integral sonar sensor device, or other suitable sensing systems known to those skilled in the art, for detecting and locating the position of oil plumes as well as sensing, for example, the depth of the ROOR-BOT. The ROOR-BOT is preferably, as is common for submersible devices, powered by the ASCC propulsion unit via an electrical powered cable having an integral suction pipe and communication link. The ROOR-BOT also can have a battery backup in case the cable malfunctions. As illustrated in FIG. 62, the cable tethers the ROOR-BOT to the ASCC and is sufficiently long so that the ROOR-BOT can be a nominal distance away and down from the ASCC, the length being dictated by the circumstances of the application. The ROOR-BOT may also have an integral sonar sensor, or other suitable sensing systems known to those skilled in the art, to assist in the location of high concentrations of oil plumes and to assist in avoiding underwater obstacles. The sensor also serves as a location beacon for the ASCC to track the ROOR-BOT. Additionally, the ROOR-BOT can be equipped with azipods. Four azipods are illustrated in the embodiment shown in FIG. 60 and FIG. 63. The azipods can enhance its mobility underwater. The azipods also serve a dual purpose of dissipating the oil plumes so that the remainder of the oil plume that is not suctioned up to the ASCC, can be cleaned up with biodegradable oil-eating microbes.

Figure 64:
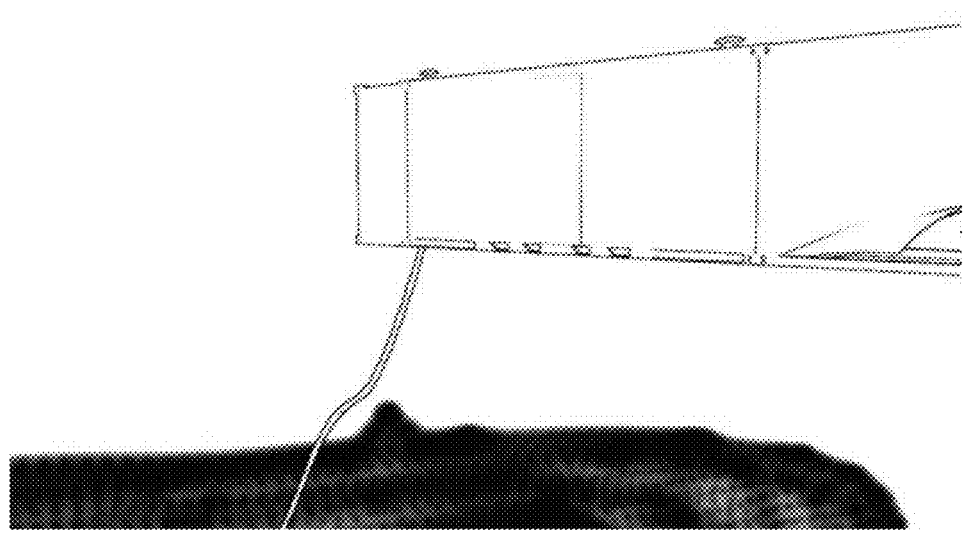
FIG. 64 illustrates aspects of an embodiment of the present invention depicting a ROOR-BOT pumping oil back into ASCC.

The ASCC container holds recovered oil plumes which are pumped up from the ROOR-BOT. The recovered oil requires a different collection methodology since its specific gravity is very close to the specific gravity of sea water. Since the oil/water mixture may not uniformly stratify in the container and may concentrate in layers, efficient concentration of the pollutants requires sensors to identify the layers, such as an acoustic sensor and multiple siphoning outlets positioned at various depths of the ASCC. The acoustic sensor identifies the presence of sea water which is then pumped out through the appropriate siphoning outlets. Preferably, there is also a hose inside the ASCC that pumps the collected crude oil from the ASCC to a connected collection bag downstream. The hose can be powered with the same transfer pump attachment discussed with respect to the ASCC hydra skimmer. The modified commercial container would house both a collection bag and a pneumatic ballast air bag that provides enough buoyancy for the modified commercial container to remain floating such as illustrated in FIG. 64. Another embodiment utilizes a barge to collect the oil that is pumped from the ASCC. As with the ASCC hydra skimmer, numerous ASCCs can be attached to the collection system based upon its size.

An Unmanned Aerial Vehicle ("UAV"), manned aircraft, or other surveillance methods may be used to transmit the approximate location of the oil plume to the ASCC. The ROOR-BOT and the ASCC collaborate to detect and localize the oil plumes. The ASCC then coordinate its movement with the ROOR-BOT to contact with the oil plume boundary. Each unit may contact on the boundary of the oil plume or a bi-static arrangement can be used where the ASCC pulses the environment and the ROOR-BOT senses and utilizes the return echo to localize the oil plume site. In an embodiment of the present invention, an appropriatesonar can be attached to the ASCC for long range searching. A short range sonar may be used on the ROOR-BOT for contacting the oil plume boundary. Once the oil plume is located, the ROOR-BOT positions the hose scoop onto the oil. The ROOR-BOT can also be equipped with a sensor to sense the presence of high concentrations of oil to initiate the suction pump.

Figure 65:
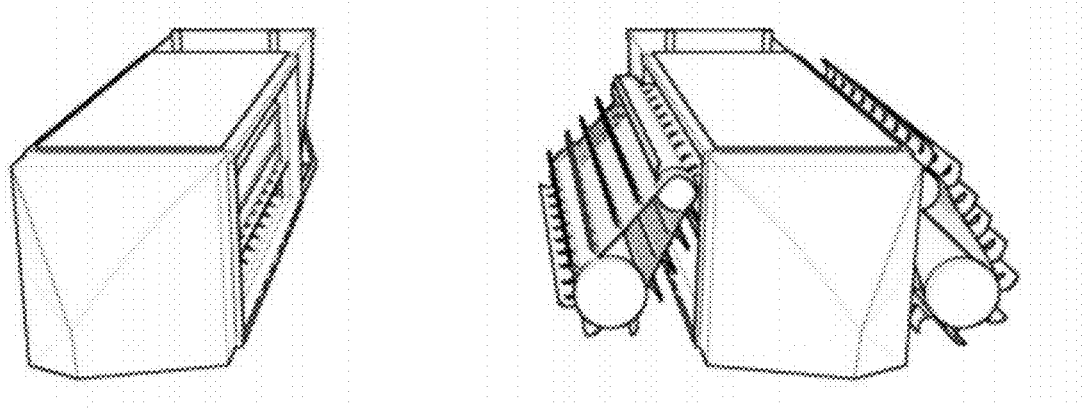
FIG. 65 illustrates aspects of an embodiment of the present invention depicting cutaway view of an automated coordinated debris collector ("ACDC") with spools stowed and spools deployed.
Figure 66:
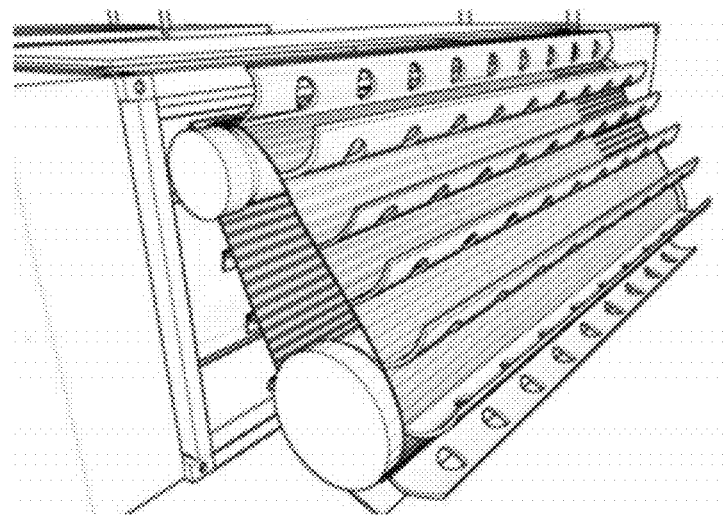
FIG. 66 illustrates aspects of an embodiment of the present invention depicting a debris collecting belt including scuppers.

While, as discussed above, the ASCC hydra skimmer can provide an effective method to clean up crude oil in the ocean and protect coastline, sea channels, and harbors, an alternate embodiment of an ASCC hydra skimmer can be used to pick up floating debris on the ocean. This can be effective where oceanic currents concentrate debris in areas such as the Great Pacific Garbage Patch. This embodiment of an ASCC hydra skimmer, referred to as an ASCC autonomous coordinated debris collector ("ACDC"), utilizes a similar concept of collecting and concentrating the floating trash through the use of booms and a modified ASCC oil collection where in the belts used to collect viscous pollutants is replaced with scuppers to collect and lift debris on and just below the surface of water, such as illustrated in FIG. 65 and FIG. 66. Unlike the ASCC hydra skimmer, the oil-collection mountable attachment is not utilized. Instead of hoses, the connections to form the ACDC are made with booms such as shown in FIG. 66. These booms can be fastened to the sides of the propulsion units. However, similar to the back of the oil-collection mountable attachment, in this embodiment, there can be two available connectors for the booms. Alternatively an ASCC can utilize boom connections to sweep and concentrate the debris to be collected by recovery ships or beach units.

Figure 67:
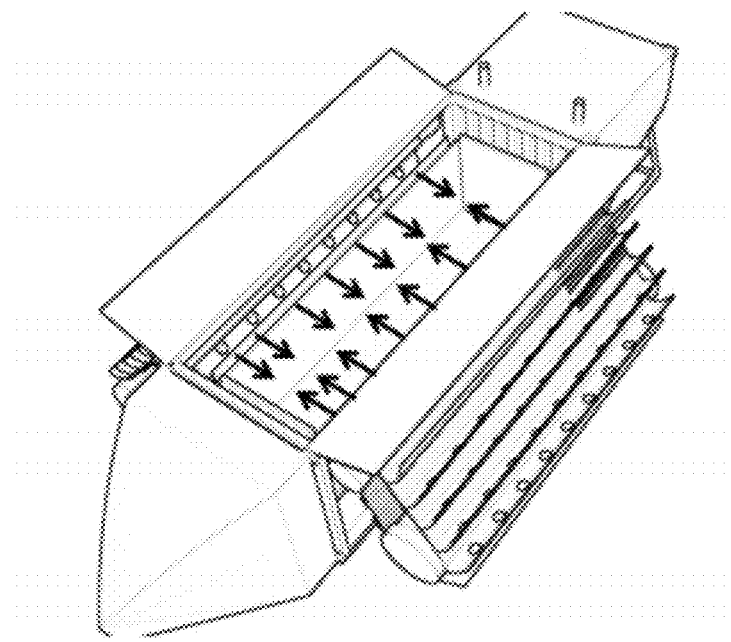
FIG. 67 illustrates aspects of an embodiment of the present invention depicting a horizontal compression of compactor plates including an opened roof.

Referring to FIG. 67, the ACDC can serve both as a debris collector and debris compactor. In one embodiment of the compactor two plates to compress the debris as illustrated in FIG. 67. Screw jacks can be utilized and can be built horizontally so that the plates on each side of the container are move together to compress the debris to a certain pressure level and then retract to their original positions to allow for further filling of the container. After the container capacity is reached, the collection roller operations are ceased. Another embodiment utilizes a plate that descends from the top surface structure to compress the debris to the bottom of the container. The plate can be connected to screwjacks, e.g., four, one for each corner of the plate. The screwjacks drive down the compactor plate in order to compress the collected debris to a certain pressure level. Once the debris has been compressed, the screwjacks raise the plate back to its original position. Since this design configuration utilizes a descending compactor plate, the rollers deployed away from the container to ensure that a sufficient gap is available for the collected debris to fall into the container. An alternate embodiment utilizes hydraulic or electric actuators to compress the collected debris. To maintain the rigid structure of the container, integrated structure is utilized above the compacting plate. In these exemplary embodiments, the linear actuators, the screwjacks, can are powered by coordinated electric motors. Additionally, the screwjacks can be activated once sensors indicate the maximum volume of debris has been collected in the container. When the compressing process is initiated, it is preferable that the rollers are shut down. After the maximum amount of collected debris has been sensed by sensors, the rollers of the ACDC units are shut down. Once the entire system of the ACDC has filled its capacity, the ACDC navigates towards its collection point, such as a ship or beach units and the leading outer ACDC units come together to surround the collection ship or designated beach locale. One of the outer ACDC units remains stationary while the other unit continues to circle around the collection ship forming a spiral to further concentrate the debris that has been brought in by the booms. The embodiment utilizing the end compressing plates can also utilize a "roof". The roof opens up down in the middle in order to serve as guides for the clamps on the collection ship which can pick up the collected debris from the ACDCs. The embodiment utilizing the vertical descending compactor plate can use the plate to open up similar to the first embodiment design in order for the debris to be emptied from the ACDC.

Figure 68:
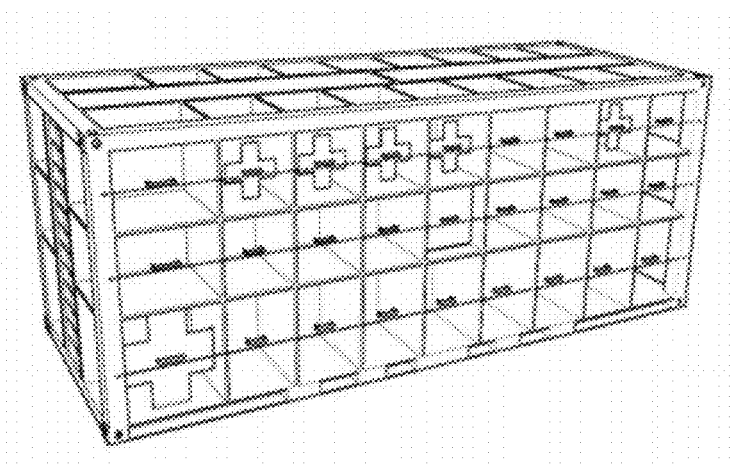
FIG. 68 illustrates aspects of an embodiment of the present invention depicting an open access container.

The current method of transporting supplies from the sea for disaster relief has been through the use of boats/ships, helicopters, etc. While this practice works, it is not efficient and requires trained personnel to be ashore to receive the deliveries and maintain security. Additionally, extensive equipment, packing/unpacking time, manpower staging, and reception sites are required to be established prior to receiving critical supplies. Referring to FIG. 68, an open access container ("OAC") utilizes ISO sized modules, easily accessible man-sized containers and autonomous delivery of the supplies from the sea to a target location onshore. The ability to robotically transport openly accessible supplies onshore without requiring a dock is vital during humanitarian aid or disaster relief missions.

In a preferred embodiment of the present invention, an OAC can include a 20 foot ISO container sized module equipped with rows of compartmented space on each side. Each of the compartments can have adjustable walls to allow customized spacing of oversized relief packs, with a fastener that secures the packs while the OAC unit is in transit. Each of the packs can be separately waterproofed and can independently add to the buoyancy to the entire unit. Each pack can also labeled with universally known symbols to indicate the contents. In an embodiment of the present invention, an OAC unit can also include two separate center core slots located down the middle of the unit which are able to include potable water, extra battery packs, fuel, or a combination of the three. The potable water and fuel containers can be equipped with a dispersal device for immediate distribution. In the event in which the waterproof packs of supplies do not provide enough buoyancy to offset the structural weight of the OAC unit, inflatable air bags may be placed in the compartments or the center core slots to supplement the required buoyancy for sea-keeping.

Figure 69:
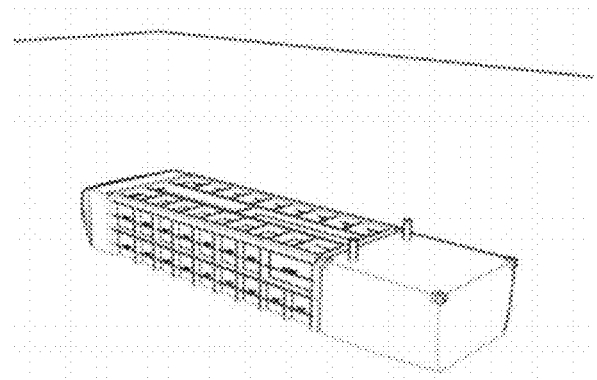
FIG. 69 illustrates aspects of an embodiment of the present invention depicting an open access container including ASCC and bow units.
Figure 70:
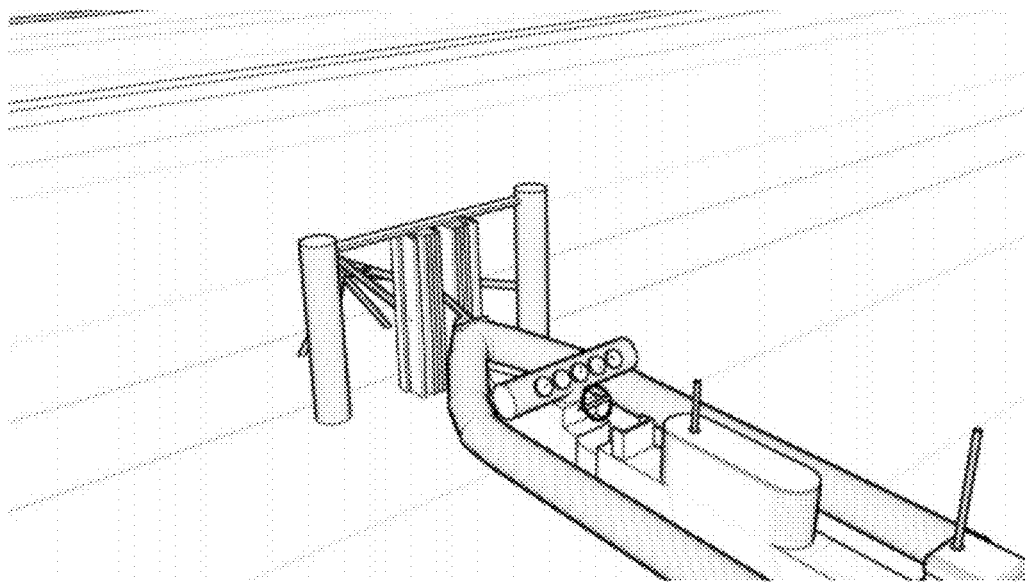
FIG. 70 illustrates aspects of an embodiment of the present invention depicting a conceptual offboard remote recovery system ("ORRS").

A preferred embodiment of an OAC utilizes an ASCC structure, including power propulsion unit and pneumatic bow unit, for navigation in the water as illustrated in FIG. 69. In a preferred embodiment, after an OAC unit is deployed, it can, utilizing the ASCC structure, navigate towards the targeted shore, continuing so, until it runs aground. Victims of the disaster could wade out into the shallow water and quickly and easily grab supply packs and bring them back to shore as desired. Another embodiment utilizes the ASCC amphibious crawler attachment, described above, to enable the OAC units to climb up onto the shore and inland. This would allow injured or elderly victims to have ready access to vital supplies. Furthermore, OAC units are not limited to 20 foot ISO container sized modules and may be substituted with any suitable container size, such as four QUADCON (8 ft×8.5 ft×5 ft) containers connected by standard ISO connectors to lessen the requirement of loading machinery necessary onshore. This configuration will assist the OAC units in being loaded onto trucks or airlifted.

Traditionally, small craft, piloted or unmanned, have been recovered from the sea in two ways: (1) the craft self-beaches itself onto a ramp/well-deck or (2) attempts to ensnare itself in some capture bridle device. Both of these methods have proven to be exceedingly difficult and dangerous, because they both attempt to control all of the dynamic forces involved between the two pitching vessels (the recovery ship, and the small craft) simultaneously. The recovery process requires a high degree of skill, accuracy and timing to allow safe recovery within the space constraints of these two recovery methods.

Referring to FIGS. 70 through 74, an offboard remote recovery system ("ORRS") reduces the criticality of the maneuvering accuracy of the small craft by placing the ORRS at the surface with the small craft, and aids in reducing the dynamic forces placed on the small craft by only restraining the small craft in a single dynamic direction to achieve certain recovery. The ORRS enhances safety of personnel and material by completing the first certain recovery step away from the large recovery vessel, out of harm's way. This distance can be varied according to the dynamic motions of both craft, vessel and ocean. It can be deployed away from the recovery ship through controlled or autonomous dynamic positioning to intersect a maneuvering small craft with a simple mechanical barb or to capture a dead in the water ("DIW") small craft equipped with the mechanical barb attachment by robotic or controlled movement with its integral thrusters.

Figure 73:
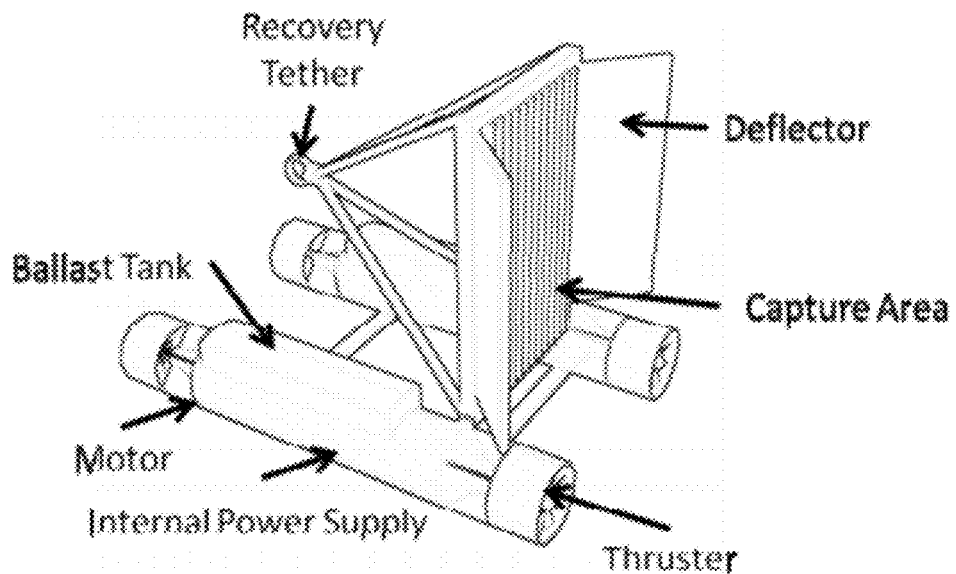
FIG. 73 illustrates aspects of an embodiment of the present invention depicting an ORRS capture area.
Figure 74:
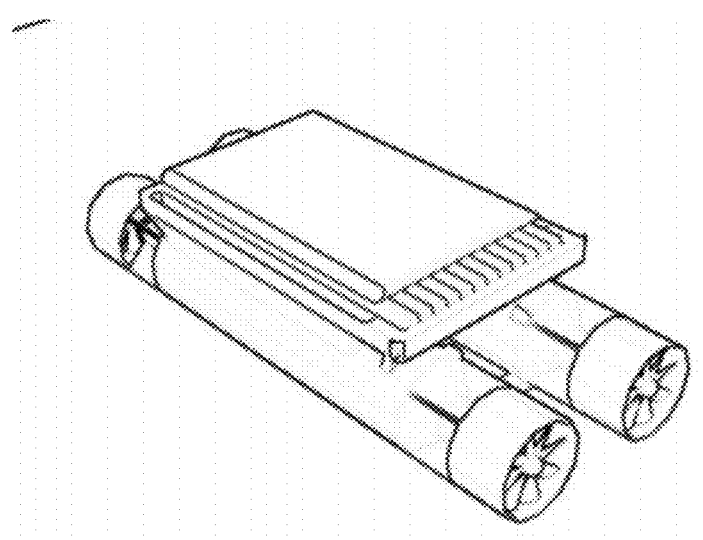
FIG. 74 illustrates aspects of an embodiment of the present invention depicting components of an ORRS.

Referring to FIG. 73, an embodiment of the ORRS restrains the small craft in a single direction using tension through the barb. The small craft is free to pitch, roll, heave and yaw with the forces of the sea. This tension is maintained by having the ORRS pull against the recovery tether until safely recovered. The level of recovery tension can be maintained by the recovery ship winching in the tether, and/or through the power of the thrusters with the two 2 pontoons of the ORRS as exemplified by the embodiment shown in FIG. 73.

Referring to FIG. 73, components of an embodiment of an ORRS can include:

Recovery Tether—This can be used to supply recovery tension to the ship, and may supply electrical power for the thrusters.

Ballast Tank—This can be used to adjust the position of the capture area slots to achieve adequate capture area and stable sea-keeping to enhance probability of capture.

Motor—In the illustrated embodiment, each thruster can be powered by a reversible electric motor, powered by the internal power supply and/or optional tether electrical power.

Internal power supply—In the illustrated embodiment, batteries can be used to provide ballast and electrical power to the necessary components.

Deflectors—As illustrated in the FIG. 73 embodiment, deflectors can be used to enhance the probability of capture, by deflecting capture probes into the capture area. They fold to allow compact storage within, for example, a twenty foot container, and four can be used per container.

Capture Area—As illustrated in the FIG. 72 and FIG. 73 embodiment, an array of vertical slats captured within an upper and a lower retaining track are held in place by flexible springs to allow a fixed capture probe to penetrate and become captured. Upon tension applied to the tether, all slats may collapse around the probe to provide additional strength and centering force.

Thrusters—As illustrated in the FIG. 73 embodiment, thrusters can be independently powered by autonomous commands coming from, for example, the ASCC controller.

Controller—The illustrated embodiment includes an onboard processor that may include GPS/position indication, status monitoring equipment and thruster command module. The controller may also supply power to beacon lights, active RF localizer links and/or night vision optimized LEDs for nighttime recovery.

Hurricanes have devastating effects levees, and can cause breaches of the levees. Long term repairs of the levees require extensive machinery which cannot be accessed until after the flood waters have begun to settle after already causing a catastrophic amount of damage. Common immediate fixes for the breaches rely on dropping very large sandbags to suppress the flood waters, placing personnel at extreme risk. This solution is only capable of handling small breaches and is essentially useless on a large scale breach.

There is a need for a robotic system to maneuver to a breach, effectively subdue flood waters rushing through a breach, and provide a short term solution so that traditional long term solutions can be utilized to completely stop the breach. The ability to remotely quickly control flood waters, reduce the time necessary for permanent solutions to be implemented, and the reduction of personnel risk and repair costs is imperative for handling future disasters.

Figure 75:
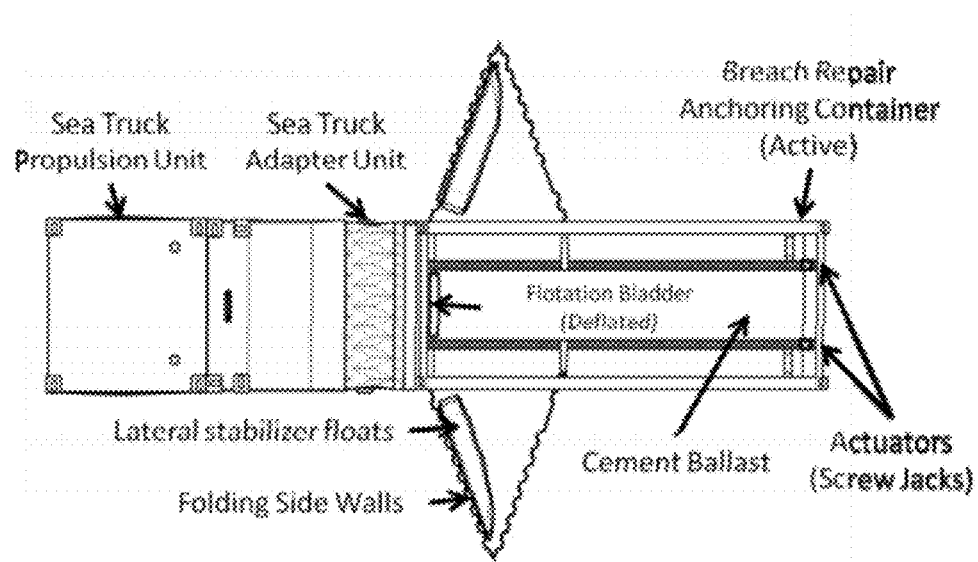
FIG. 75 illustrates aspects of an embodiment of the present invention depicting a collapsed ORRS.

FIG. 75 illustrates a breach repair system ("BRS"). The BRS includes a breach repair anchoring container, an anchoring container adapter unit, an ASCC Adapter unit, and an ASCC propulsion unit. The breach repair anchoring container can be an ISO container sized module equipped with folding side walls on each side. The breach repair anchoring container can be attached to the anchoring container adapter unit with four ISO-connectors forming the breach repair anchoring unit as illustrated in FIG. 75. The anchoring container adapter unit can be connected to the ASCC Adapter unit with two electronically controlled ISO-connectors that are capable of attaching/detaching upon command from, for example, the ASCC controller. The rollers on the ASCC adapter unit allow for the breach repair anchoring unit to roll off the ASCC adapter unit when its ISO-connectors electronically detach. The ASCC adapter unit is preferably mechanically connected to the ASCC propulsion unit with four ISO-connectors are commanded to detach.

The interior components of the breach repair anchoring container can include a screwjack on each side, a motor, a flotation bladder, cement or gravel ballast, and lateral stabilizer floats. When the screwjacks rotate (in a coordinated fashion), the side walls begin to fold toward the fore or aft of the container. The screwjacks rotations are preferably coordinated to ensure the symmetry of the folding side walls reducing the chance of roll instability during reconfiguration. An alternate embodiment would have small buoyancy structures integral to the side walls to ensure roll stability.

Figure 76:
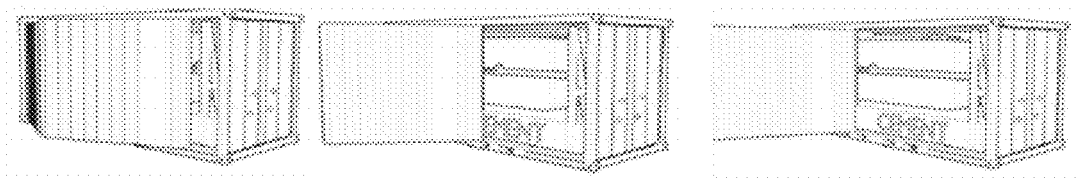
FIG. 76 illustrates aspects of an embodiment of the present invention depicting a breach repair system ("BRS").

While there are many embodiments of the BRS, the following discusses three different configurations that can power the rotation of the screwjacks. The first configuration preferably uses an electric motor which is preferably powered by sacrificial batteries. The second configuration uses an electric motor which is preferably powered via a breakaway electrical connection with the ASCC propulsion unit. The third configuration preferably uses a pneumatic air drive motor powered by a sacrificial compressed air cylinder. All three configurations are remotely controlled in the illustrated embodiment. The flotation bladder provides buoyancy for the breach repair anchoring unit, until placement process is underway. The breach repair anchoring unit can be open to outside water, such as illustrated in FIG. 76, and can be flooded. The controlled deflation of the flotation bladder ensures a controlled sink rate for the BRS ensuring full sequencing of the side walls prior to placement of the submerged unit in the breach. The cement ballast coupled with the upstream water pressure ensures that the BRS remains in place. The lateral stabilizer floats shown in FIG. 75 provide stability while the BRS is being deployed.

Figure 77:
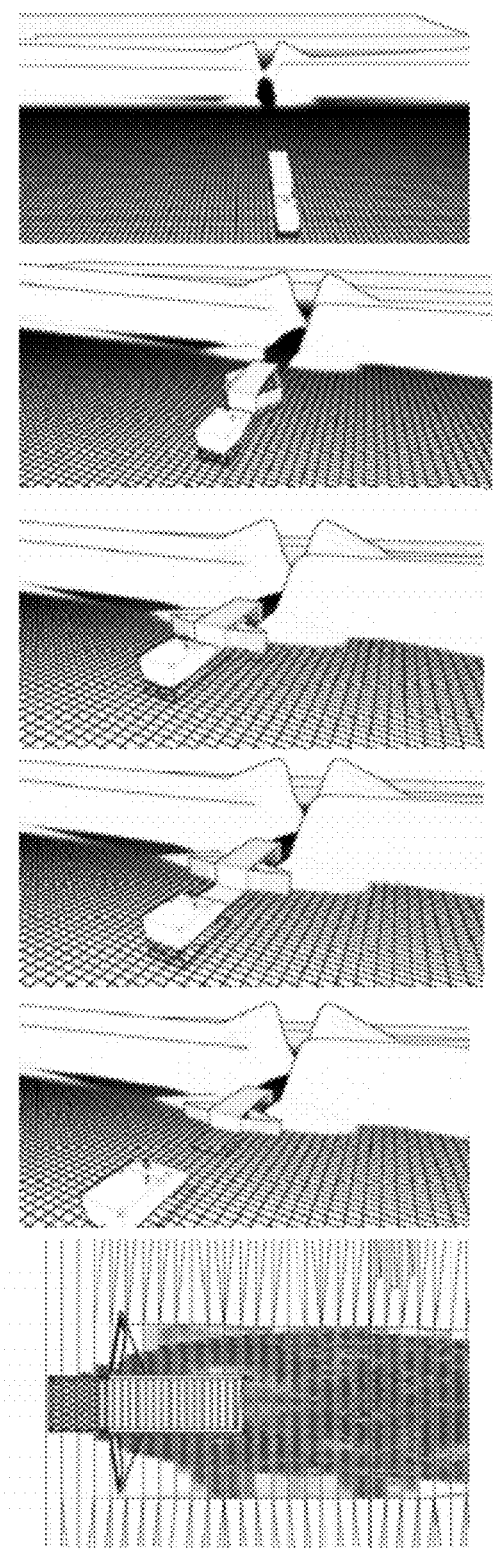
FIG. 77 illustrates aspects of an embodiment of the present invention depicting an internal view of a BRS
Figure 78:
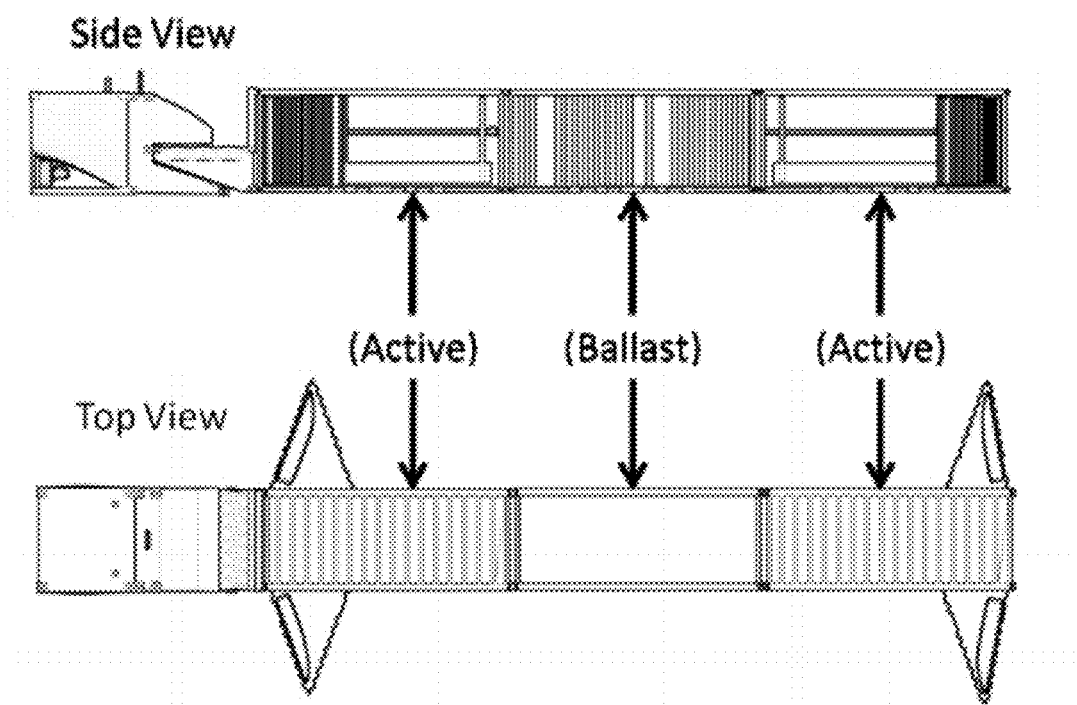
FIG. 78 illustrates aspects of an embodiment of the present invention depicting a flow diagram embodying a BRS.
Figure 79:
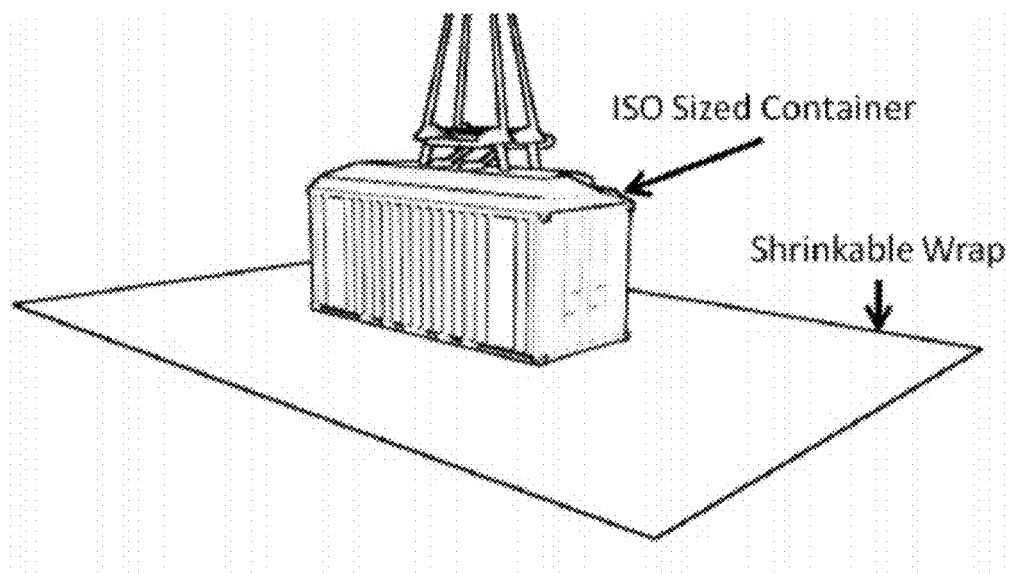
FIG. 79 illustrates aspects of an embodiment of the present invention depicting a BRS including additional sacrificial units.
Figure 80:
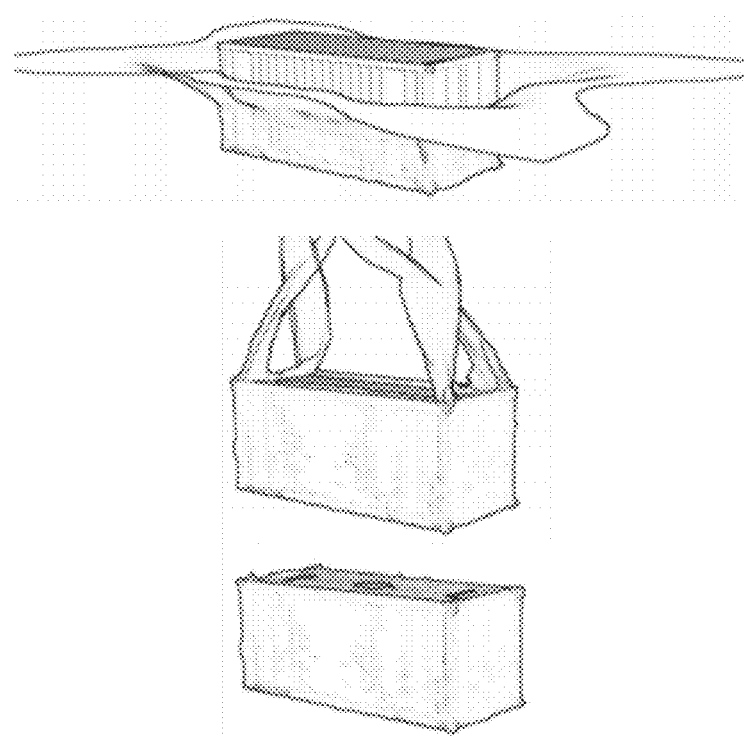
FIG. 80 illustrates an ISO-sized container being placed on shrinkable wrap.
Figure 81:
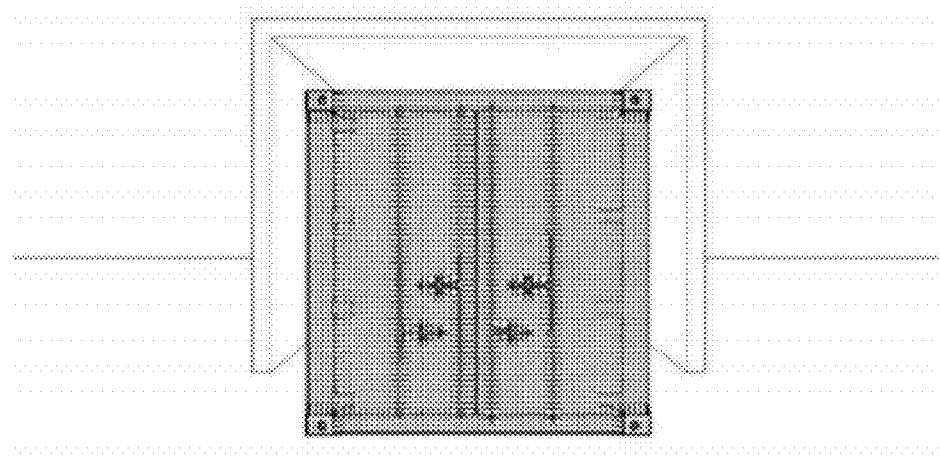
FIG. 81 illustrates applying a shrinkable wrap to an ISO-sized container.
Figure 82:
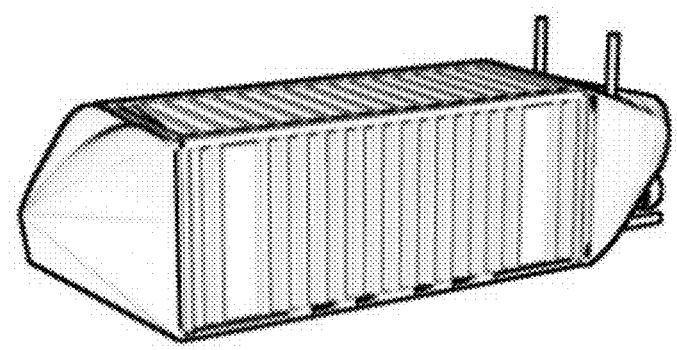
FIG. 82 illustrates applying a heat to seal the shrinkable wrap to an ISO-sized container.

The following describes an exemplary operation scenario and references FIG. 77. Initially a BRS is deployed from, for example, an upstream depot or supply vessel. Once the BRS is released into the water, it then navigates by remote control, GPS, or a combination of both toward the breach as an ASCC. When it arrives at the breach, the sinking sequence is initiated with engagement of the screwjacks shown in FIG. 75. The actuators then begin to rotate thereby folding the corresponding side walls. The deflation of the flotation bladder is sequenced with the side wall folding to ensure proper placement of the BRS in the breach. The ISO-connectors that connect the ASCC Adapter unit to the Breach Repair Anchoring unit are then remotely disconnected and the breach repair anchoring unit rolls off the ASCC and sinks to form a permanent plug in the breach. If additional weight is needed to maintain the BRS placement within the breach, additional sacrificial units may be added to the BRS before deployment as shown in FIG. 78. Additional units can be deployed as needed to provide anchoring points for, for example, portable fabric repair systems or traditional sandbag systems.

Referring to FIGS. 79-82, a unique application of commercially available winterizing wrap can be applied to any ISO-sized container to ensure total waterproofing is attained. For example, 8, 12 or 16 mil shrinkable wrap that is currently used to winterize pleasure craft can be utilized for in this technique. A novel application of this wrap includes laying the material out, placing the container on top of the wrap, then folding the wrap up to cover the top of the container, and then shrinking the wrap over the entire container using a either a propane gun or an infrared heat source. The attachment of the ASCC bow and stern units will not penetrate the waterproofing wrap around the container. The ISO end receptacles are waterproof and isolated from the interior of the containers. Once the units are unattached from the container, the wrap can be readily removed to gain access into the interior of the container and its contents.

Additional uses for the ASCC for both beaching and amphibious crawler units can include: (a) solar powered energy generation and solar powered desalination/water purification unit(s) delivery, (b) fuel powered energy generation, (c) nuclear powered energy generation to the beach environment for utilization along the shore, and/or transport inland.

The invention claimed is:

1. An autonomous maritime container system comprising:
a commercial container;
a transporter detachably connected to the commercial container, and including a retractable track assembly;
a connector apparatus positioned between the commercial container and the transporter so as to detachably and mechanically connect an end of the commercial container to the transporter;
a bow unit including a second retractable track assembly;
a second connector apparatus positioned between the commercial container and the bow unit so as to detachably and mechanically connect a second end of the commercial container to the transporter; and a control apparatus operatively connected to the track assemblies so as to move the commercial container toward a desired location.

2. An autonomous maritime container system comprising:

a commercial container;

a transporter detachably connected to the commercial container, and including a crawler assembly;

a connector apparatus positioned between the commercial container and the transporter so as to detachably and mechanically connect an end of the commercial container to the transporter;

a bow unit including a second crawler assembly;

a second connector apparatus positioned between the commercial container and the bow unit so as to detachably and mechanically connect a second end of the commercial container to the transporter; and a control apparatus operatively connected to the crawler assemblies so as to move the commercial container toward a desired location.

3. The autonomous maritime container system according to claim 2, where in the crawler assemblies are rotatable so as to move the container.

4. The autonomous maritime container system according to claim 2, wherein the commercial container is an ISO sized container.

* * * * *